(12) United States Patent
Suzuki et al.

(10) Patent No.: US 10,219,267 B2
(45) Date of Patent: Feb. 26, 2019

(54) TERMINAL DEVICE, COMMUNICATION METHOD, AND INTEGRATED CIRCUIT

(71) Applicant: Sharp Kabushiki Kaisha, Sakai, Osaka (JP)

(72) Inventors: Shoichi Suzuki, Sakai (JP); Tatsushi Aiba, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/737,344

(22) PCT Filed: Jun. 15, 2016

(86) PCT No.: PCT/JP2016/067741
§ 371 (c)(1),
(2) Date: Dec. 18, 2017

(87) PCT Pub. No.: WO2016/204165
PCT Pub. Date: Dec. 22, 2016

(65) Prior Publication Data
US 2018/0199313 A1    Jul. 12, 2018

(30) Foreign Application Priority Data

Jun. 19, 2015    (JP) .................................. 2015-123364

(51) Int. Cl.
| | | |
|---|---|---|
| *H04W 72/04* | (2009.01) | |
| *H04H 20/30* | (2008.01) | |
| *H04H 40/18* | (2008.01) | |
| *H04W 72/00* | (2009.01) | |
| *H04W 72/12* | (2009.01) | |

(Continued)

(52) U.S. Cl.
CPC .......... *H04W 72/042* (2013.01); *H04H 20/30* (2013.01); *H04H 40/18* (2013.01); *H04W 52/0216* (2013.01); *H04W 72/005* (2013.01); *H04W 72/04* (2013.01);
(Continued)

(58) Field of Classification Search
CPC ............. H04W 72/042; H04W 72/005; H04W 72/044; H04W 72/1257
See application file for complete search history.

(56) References Cited

U.S. PATENT DOCUMENTS

2015/0223075 A1* 8/2015 Bashar .................. H04W 16/14
370/329

OTHER PUBLICATIONS

LG Electronics et al., "WF on principle of M-PDCCH search space design", 3GPP TSG RAN WG1 #81, R1-153458, May 25-29, 2015, 3 pages.
(Continued)

*Primary Examiner* — Keith Ferguson
(74) *Attorney, Agent, or Firm* — Keating & Bennett, LLP

(57) ABSTRACT

A terminal device monitors an MPDCCH in a search space, and performs a DRX functionality for controlling monitoring of the MPDCCH. The search space including a first MPDCCH candidate and a second MPDCCH candidate, a beginning OFDM symbol in the first MPDCCH candidate being identical to a beginning OFDM symbol in the second MPDCCH candidate, and a repetition level of the first MPDCCH candidate being lower than a repetition level of the second MPDCCH candidate. When the MPDCCH detected in the first MPDCCH candidate indicates initial transmission, a drx-InactivityTimer in a last subframe in the second MPDCCH candidate is started or restarted.

3 Claims, 15 Drawing Sheets

(51) Int. Cl.
*H04W 52/02* (2009.01)
*H04W 76/28* (2018.01)

(52) U.S. Cl.
CPC ....... *H04W 72/1257* (2013.01); *H04W 76/28* (2018.02); *Y02D 70/24* (2018.01)

(56) References Cited

OTHER PUBLICATIONS

ZTE et al., "Way Forward on PUCCH enhancement for MTC", 3GPP TSG RAN WG1 Meeting #81, R1-153571, May 25-29, 2015, 3 pages.
Nokia Networks, "Physical Downlink Control Channel for MTC", 3GPP TSG-RAN WG1 Meeting #80bis, R1-151305, Apr. 20-24, 2015, 4 pages.
Ericsson et al., "Expiry of drx-Inactivity Timer", 3GPP TSG-RAN2 Meeting #80, R2-125746, Nov. 12-16, 2012, 3 pages.

* cited by examiner

| UL-DL CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms  | D | S | U | U | U | D | S | U | U | U |
| 1 | 5ms  | D | S | U | U | D | D | S | U | U | D |
| 2 | 5ms  | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms  | D | S | U | U | U | D | S | U | U | D |

FIG. 3

TERMINAL DEVICE, COMMUNICATION METHOD, AND INTEGRATED CIRCUIT

TECHNICAL FIELD

The present invention relates to a terminal device, a communication method, and an integrated circuit.
This application claims priority based on JP 2015-123364 filed on Jun. 19, 2015, the contents of which are incorporated herein by reference.

BACKGROUND ART

In the 3rd Generation Partnership Project (3GPP), a radio access method and a radio network for cellular mobile communications (hereinafter referred to as "Long Term Evolution (LTE)", "Evolved Universal Terrestrial Radio Access (EUTRA)", or "Evolved Universal Terrestrial Radio Access Network (EUTRAN)") have been studied. In LTE, a base station device is also referred to as an evolved NodeB (eNodeB), and a terminal device is also referred to as User Equipment (UE). LTE is a cellular communication system in which an area is divided into multiple cells to form a cellular pattern, each of the cells being served by a base station device. A single base station device may manage multiple cells.

LTE supports Time Division Duplex (TDD). LTE that employs a TDD scheme is also referred to as TD-LTE or LTE TDD. In TDD, uplink signals and downlink signals are time-division multiplexed. In addition, LTE supports Frequency Division Duplex (FDD).

In LTE, Downlink Control Information (DCI) is transmitted using a Physical Downlink Control CHannel (PDCCH) and an Enhanced Physical Downlink Control CHannel (EPDCCH). DCI is used for scheduling of a Physical Downlink Shared CHannel (PDSCH) in a cell.

A technique for transmitting a Machine type communication Physical Downlink Control CHannel (MPDCCH) in multiple subframes has been studied in the 3GPP to improve a downlink cell coverage (NPL 1). In addition, a technique for transmitting a Physical Uplink Control CHannel (PUCCH) in multiple subframes has been studied in the 3GPP to improve an uplink cell coverage (NPL 2).

CITATION LIST

Non-Patent Literature

NPL 1: "R1-153458 WF on principle of M-PDCCH search space design", 3GPP TSG RAN WG1 #81, 25-29, May 2015.
NPL 2: "R1-153571 Way Forward on PUCCH enhancement for MTC", 3GPP TSG RAN WG1 #81, 25-29, May 2015.

DISCLOSURE OF THE INVENTION

Problems to be Solved by the Invention

According to some aspects of the present invention, a terminal device is capable of efficiently communicating with a base station device on a physical channel included in multiple subframes, an integrated circuit mounted on the terminal device, and a communication method used by the terminal device.

Means for Solving the Problems (1) To accomplish the object described above, according to some aspects of the present invention, the following measures are taken. Specifically, a first aspect of the present invention is a terminal device that includes: a reception unit configured to monitor an MPDCCH in a search space; and a medium access control layer processing unit configured to perform a DRX functionality for controlling monitoring of the MPDCCH, the search space including a first MPDCCH candidate and a second MPDCCH candidate, a beginning OFDM symbol in the first MPDCCH candidate being identical to a beginning OFDM symbol in the second MPDCCH candidate, a repetition level of the first MPDCCH candidate being lower than a repetition level of the second MPDCCH candidate. When the MPDCCH detected in the first MPDCCH candidate indicates initial transmission, the medium access control layer processing unit starts or restarts drx-InactivityTimer in a last subframe in the second MPDCCH candidate.

(2) A second aspect of the present invention is a communication method used by a terminal device, the communication method including: monitoring an MPDCCH in a search space; and performing a DRX functionality for controlling monitoring of the MPDCCH, the search space including a first MPDCCH candidate and a second MPDCCH candidate, a beginning OFDM symbol in the first MPDCCH candidate being identical to a beginning OFDM symbol in the second MPDCCH candidate, a repetition level of the first MPDCCH candidate being lower than a repetition level of the second MPDCCH candidate. When the MPDCCH detected in the first MPDCCH candidate indicates initial transmission, a drx-InactivityTimer in a last subframe in the second MPDCCH candidate is started or restarted.

(3) A third aspect of the present invention is an integrated circuit mounted on a terminal device, the integrated circuit including: a reception circuit configured to monitor an MPDCCH in a search space; and a medium access control layer processing circuit configured to perform a DRX functionality for controlling monitoring of the MPDCCH, the search space including a first MPDCCH candidate and a second MPDCCH candidate, a beginning OFDM symbol in the first MPDCCH candidate being identical to a beginning OFDM symbol in the second MPDCCH candidate, a repetition level of the first MPDCCH candidate being lower than a repetition level of the second MPDCCH candidate When the MPDCCH detected in the first MPDCCH candidate indicates initial transmission, the medium access control layer processing circuit starts or restarts a drx-InactivityTimer in a last subframe in the second MPDCCH candidate.

EFFECTS OF THE INVENTION

According to some aspects of the present invention, a terminal device and a base station device are capable of efficiently communicating on physical channels included in multiple subframes.

BRIEF DESCRIPTION OF THE DRAWINGS

FIG. 3 is a table illustrating one example of a UL-DL configuration in the present embodiment.

MODE FOR CARRYING OUT THE INVENTION

An embodiment of the present invention will be described below.

Figure 1:
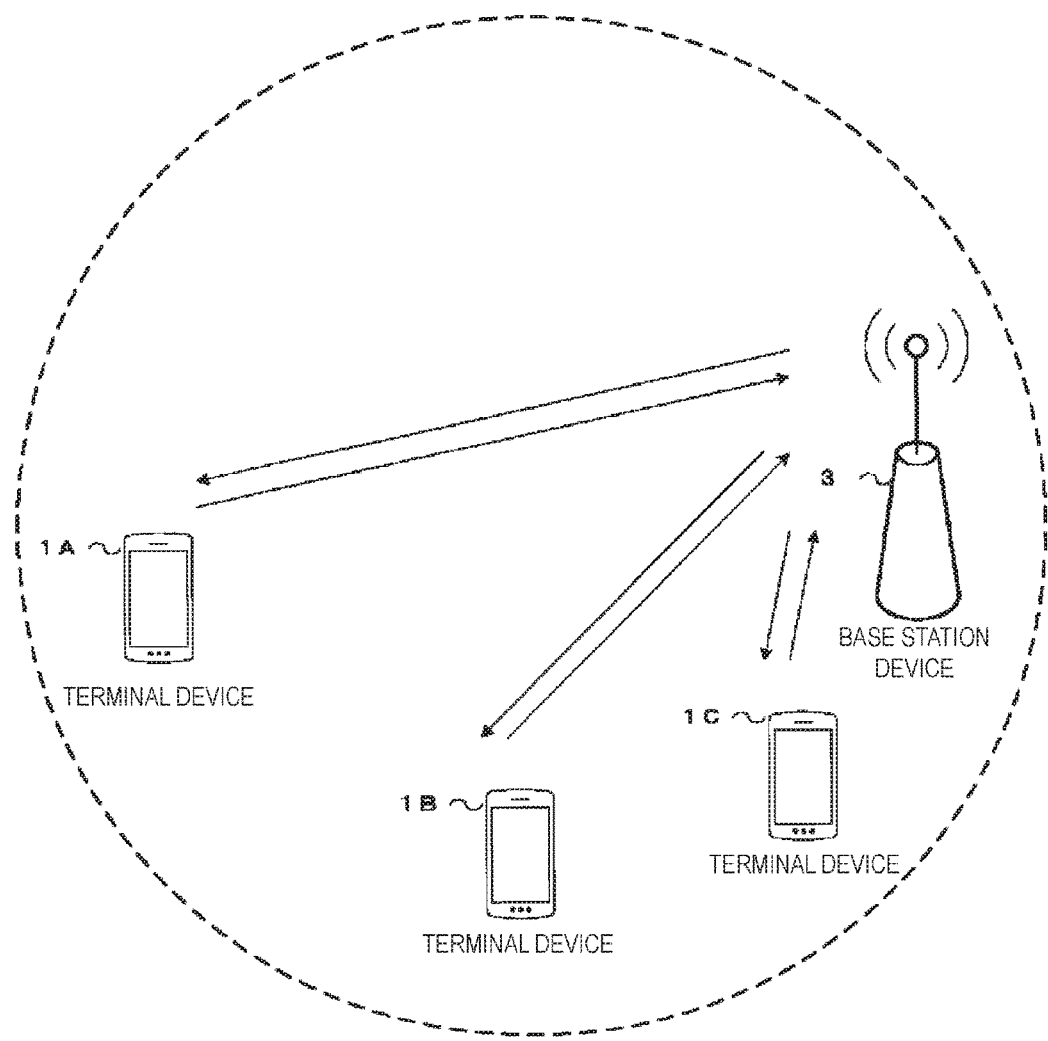
FIG. 1 is a conceptual diagram of a radio communication system in the present embodiment.

FIG. 1 is a conceptual diagram of a radio communication system in the present embodiment. In FIG. 1, the radio communication system includes terminal devices 1A to 1C and a base station device 3. Hereinafter, terminal devices 1A to 1C are each referred to as a terminal device 1.

The present embodiment may be applied to an RRC_CONNECTED state, or only to the terminal device 1 in an RRC_CONNECTED mode. The present embodiment may be applied to an RRC_IDLE state or only to the terminal device 1 in the RRC_IDLE state. The present embodiment may be applied to both the RRC_CONNECTED state or the terminal device 1 in the RRC_CONNECTED mode, and the RRC_IDLE state or the terminal device 1 in the RRC_IDLE state.

In the present embodiment, one serving cell is configured for the terminal device 1. The one serving cell may be a primary cell. The one serving cell may be a cell on which the terminal device 1 is camping. The primary cell is a cell in which an initial connection establishment procedure has been performed, a cell in which a connection re-establishment procedure has started, or a cell indicated as a primary cell in a handover procedure.

In the downlink, a carrier corresponding to the serving cell is referred to as a downlink component carrier. In the uplink, a carrier corresponding to the serving cell is referred to as an uplink component carrier. The downlink component carrier and the uplink component carrier are collectively referred to as a component carrier. In FDD, the uplink component carrier and the downlink component carrier correspond to different carrier frequencies. In TDD, the uplink component carrier and the downlink component carrier correspond to the same carrier frequencies.

In the downlink, one independent HARQ entity exists for each serving cell (downlink component carrier). The HARQ entity manages multiple HARQ processes in parallel. Each of the HARQ processes instructs a physical layer to receive data based on a received downlink assignment (downlink control information).

In the downlink, at least one transport block is generated for each of one or more Transmission Time Intervals (TTIs) for each serving cell. The transport block and HARQ retransmission of the transport block are mapped to one serving cell. Note that, in LTE, a TTI serves as a subframe. The transport block in the downlink is MAC layer data transmitted on the DownLink Shared CHannel (DL-SCH).

In the present embodiment, in the uplink, "transport block", "MAC Protocol Data Unit (PDU)", "MAC layer data", "DL-SCH", "DL-SCH data", and "downlink data" are assumed to mean the same thing.

Physical channels and physical signals in the present embodiment will be described.

One physical channel is mapped to one or more subframes. In the present embodiment, "one physical channel included in multiple subframes", "one physical channel mapped to multiple subframes", "one physical channel including resources of multiple subframes", and "one physical channel repeatedly transmitted over multiple subframes" are assumed to mean the same thing.

In uplink radio communication from the terminal device 1 to the base station device 3, the following uplink physical channels are used. The uplink physical channels are used to transmit information output from a higher layer.

Physical Uplink Control CHannel (PUCCH)
Physical Uplink Shared CHannel (PUSCH)
Physical Random Access CHannel (PRACH)

The PUCCH is used to transmit Uplink Control Information (UCI). The uplink control information includes: downlink Channel State Information (CSI); a Scheduling Request (SR) to be used to request a PUSCH (UpLink-Shared CHannel (UL-SCH)) resource for initial transmission; and a Hybrid Automatic Repeat reQuest ACKnowledgement (HARQ-ACK) for downlink data (a transport block, a medium access control protocol data unit (MAC PDU), a DownLink-Shared CHannel (DL-SCH), or a Physical DownLink Shared CHannel (PDSCH)). The HARQ-ACK indicates an ACKnowledgement (ACK) or a Negative-ACKnowledgement (NACK). The HARQ-ACK is also referred to as ACK/NACK, HARQ feedback, HARQ acknowledge, or HARQ control information.

The scheduling request includes a positive scheduling request or a negative scheduling request. The positive scheduling request indicates requesting of a UL-SCH resource for initial transmission. The negative scheduling request indicates not requesting of any UL-SCH resource for initial transmission.

The PUSCH is used to transmit uplink data (UpLink-Shared CHannel (UL-SCH)). Furthermore, the PUSCH may be used to transmit the HARQ-ACK and/or channel state information along with the uplink data. Furthermore, the PUSCH may be used to transmit only the channel state information. Furthermore, the PUSCH may be used to transmit only the HARQ-ACK and the channel state information.

Here, the base station device 3 and the terminal device 1 exchange signals in (transmit and receive a signal to and from) higher layers. For example, the base station device 3 and the terminal device 1 may transmit and receive RRC signaling in a Radio Resource Control (RRC) layer. Moreover, the base station device 3 and the terminal device 1 may transmit and receive a Medium Access Control (MAC) CE in a MAC layer. Here, the RRC signaling and/or the MAC CE are/is also referred to as higher layer signaling. The RRC signaling and/or the MAC CE are/is included in a transport block.

In the present embodiment, "RRC signaling", "RRC layer information", "RRC layer signal" "RRC layer parameter", "RRC message", and "RRC information element" are assumed to mean the same thing.

The PUSCH is used to transmit the RRC signaling and the MAC CE. Here, the RRC signaling transmitted from the base station device 3 may be signaling common to multiple terminal devices 1 in a cell. Alternatively, the RRC signaling transmitted from the base station device 3 may be signaling dedicated to a certain terminal device 1 (also referred to as dedicated signaling). In other words, user device-specific information is transmitted using the signaling dedicated to a certain terminal device 1.

The PRACH is used to transmit a random access preamble. The PRACH is used to indicate an initial connection establishment procedure, a handover procedure, a connection re-establishment procedure, synchronization (timing adjustment) for uplink transmission, and the request for a PUSCH (UL-SCH) resource.

The following uplink physical signal is used for uplink radio communication. The uplink physical signal is not used to transmit information output from the higher layers, but is used in the physical layer.

UpLink Reference Signal (UL RS)

The following downlink physical channels are used for downlink radio communication from the base station device 3 to the terminal device 1. The downlink physical channels are used to transmit the information output from the higher layers.

Physical Broadcast CHannel (PBCH)
Physical Control Format Indicator CHannel (PCFICH)
Physical Hybrid Automatic Repeat Request Indicator CHannel (PHICH)
Physical Downlink Control CHannel (PDCCH)
Enhanced Physical Downlink Control CHannel (EPDCCH)
Machine type communication Physical Downlink Control CHannel (MPDCCH)
Physical Downlink Shared CHannel (PDSCH)
Physical Multicast CHannel (PMCH)

The PBCH is used to broadcast a Master Information Block (MIB), or a Broadcast CHannel (BCH), which is commonly used by the terminal devices 1.

The PCFICH is used to transmit information indicating a region (OFDM symbols) to be used for transmitting the PDCCH.

The PHICH is used to transmit an HARQ indicator (HARQ feedback or response information) indicating an ACKnowledgement (ACK) or a Negative ACKnowledgement (NACK) with respect to the uplink data (UpLink Shared CHannel (UL-SCH)) received by the base station device 3.

The PDCCH, the EPDCCH, and the MPDCCH are used for transmitting Downlink Control Information (DCI). In the present embodiment, the "PDCCH" is assumed to include the "EPDCCH" and the "MPDCCH", for the sake of convenience. The downlink control information is also referred to as a DCI format. The downlink control information transmitted on one PDCCH includes a downlink grant and HARQ information, or an uplink grant and HARQ information. The downlink grant is also referred to as a downlink assignment or a downlink allocation. The downlink assignment and the uplink grant are not transmitted together on one PDCCH.

The downlink assignment is used for scheduling a single PDSCH within a single cell. The downlink assignment may be used for scheduling the PDSCH within the same subframe as the subframe in which the downlink grant is transmitted. The downlink assignment may be used for scheduling the PDSCH included in the subframe in which the downlink grant is transmitted and in one or more subsequent subframes.

The uplink grant is used for scheduling a single PUSCH within a single cell. The uplink grant may be used for scheduling a PUSCH included in one or more subframes subsequent to the subframe in which the uplink grant is transmitted.

Cyclic Redundancy Check (CRC) parity bits attached to the downlink control information transmitted on one PDCCH are scrambled with a Cell-Radio Network Temporary Identifier (C-RNTI), a Semi Persistent Scheduling (SPS) C-RNTI, or a Temporary C-RNTI. The C-RNTI and the SPS C-RNTI serve as identifiers for identifying a terminal device within a cell. The Temporary C-RNTI serves as an identifier for identifying the terminal device 1 that has transmitted a random access preamble in a contention based random access procedure.

The C-RNTI and the Temporary C-RNTI are used to control PDSCH transmission or PUSCH transmission in a single subframe. The SPS C-RNTI is used to periodically allocate PDSCH or PUSCH resources.

The PDSCH is used to transmit downlink data (DownLink Shared CHannel (DL-SCH)).

The PMCH is used to transmit multicast data (Multicast CHannel (MCH)).

The following downlink physical signals are used in the downlink radio communication. The downlink physical signals are not used to transmit the information output from the higher layers, but are used in the physical layer.

Synchronization Signal (SS)
DownLink Reference Signal (DL RS)

The synchronization signal is used for the terminal device 1 to be synchronized in frequency and time domains for downlink. In the TDD scheme, the synchronization signal is mapped to subframes 0, 1, 5, and 6 in a radio frame. In the FDD scheme, the synchronization signal is mapped to subframes 0 and 5 in the radio frame.

The downlink reference signal is used for the terminal device 1 to perform channel compensation of the downlink physical channel. The downlink reference signal is used for the terminal device 1 to calculate the downlink channel state information.

In the present embodiment, the following five types of downlink reference signals are used.

Cell-specific Reference Signal (CRS)
UE-specific Reference Signal (URS) associated with the PDSCH
DeModulation Reference Signal (DMRS) associated with the EPDCCH
Non-Zero Power Channel State Information-Reference Signal (NZP CSI-RS)
Zero Power Channel State Information-Reference Signal (ZP CSI-RS)
Multimedia Broadcast and Multicast Service over Single Frequency Network Reference Signal (MBSFN RS)
Positioning Reference Signal (PRS)

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as a physical signal.

The BCH, the MCH, the UL-SCH, and the DL-SCH serve as transport channels. A channel used in the Medium Access Control (MAC) layer is referred to as a transport channel. The unit of the transport channel used in the MAC layer is also referred to as a Transport Block (TB) or a MAC Protocol Data Unit (PDU). Control of a Hybrid Automatic Repeat reQuest (HARQ) is performed for each transport block in the MAC layer. The transport block is a unit of data delivered by the MAC layer delivers to the physical layer. In the physical layer, the transport block is mapped to a codeword, and coding processing is performed for each codeword.

A structure of a radio frame in the present embodiment will be described.

In LTE, two radio frame structures are supported. The two radio frame structures are Frame structure Type 1 and Frame structure Type 2. Frame structure Type 1 is applicable to FDD. Frame structure Type 2 is applicable to TDD.

Figure 2:
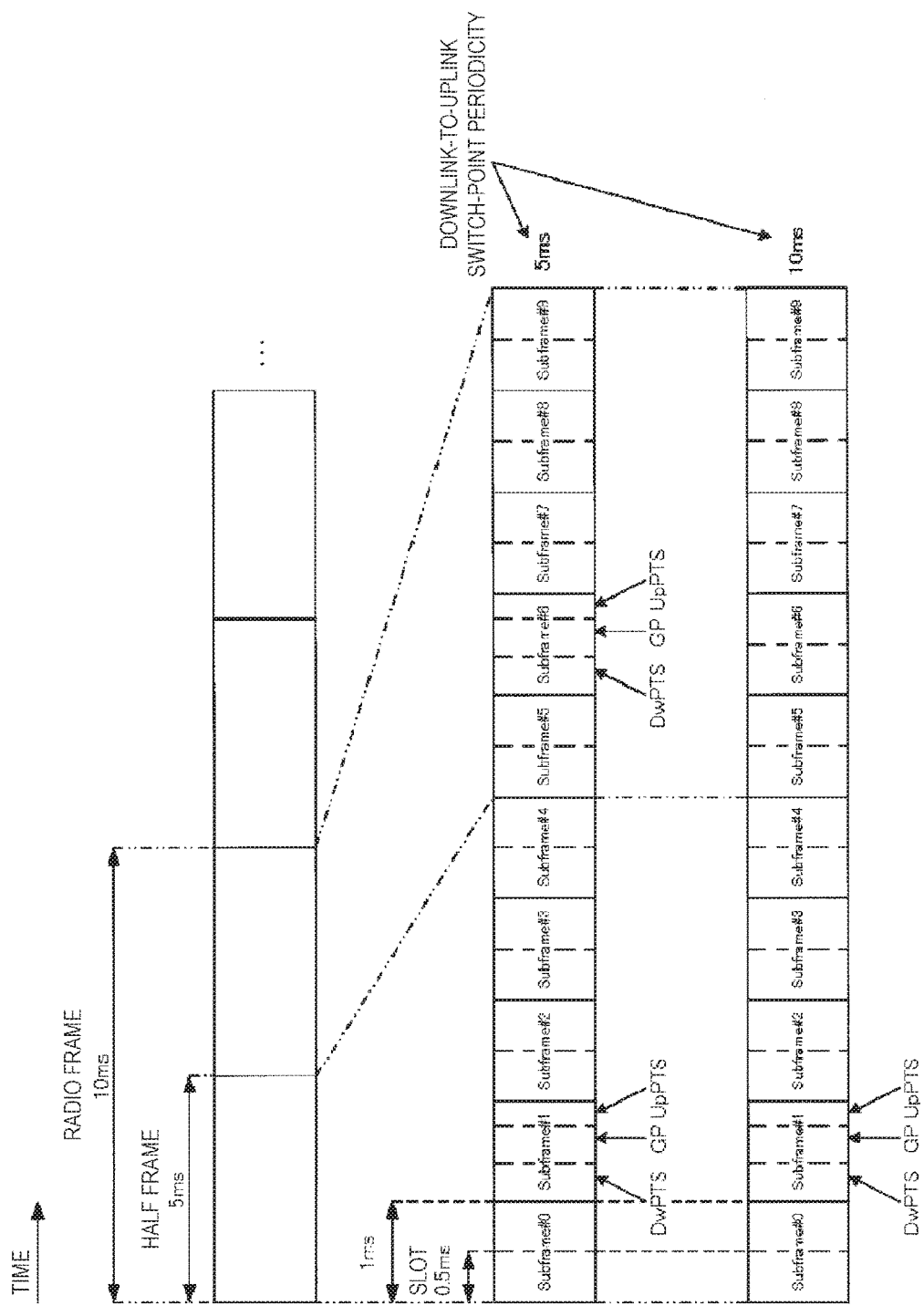
FIG. 2 is a diagram illustrating a schematic configuration of a radio frame in the present embodiment.

FIG. 2 is a diagram illustrating a schematic configuration of the radio frame in the present embodiment. In FIG. 2, the horizontal axis represents a time axis. Moreover, each of the radio frames of Type 1 and Type 2 is 10 ms in length and is defined by 10 subframes. Each of the subframes is 1 ms in length and is defined by two consecutive slots. Each of the slots is 0.5 ms in length. The i-th subframe in a radio frame includes a (2×i)-th slot and a (2×i+1)-th slot.

The following three types of subframes are defined for Frame structure Type 2.
 Downlink subframe
 Uplink subframe
 Special subframe The downlink subframe serves as a subframe reserved for downlink transmission. The uplink subframe serves as a subframe reserved for uplink transmission. The special subframe includes three fields. The three fields include a Downlink Pilot Time Slot (DwPTS), a Guard Period (GP), and an Uplink Pilot Time Slot (UpPTS). The total length of the DwPTS, the GP, and the UpPTS is 1 ms. The DwPTS is a field reserved for downlink transmission. The UpPTS is a field reserved for uplink transmission. The GP is a field in which neither the downlink transmission nor the uplink transmission is performed. Note that the special subframe may include only the DwPTS and the GP, or may include only the GP and the UpPTS.

A radio frame of Frame structure Type 2 includes at least the downlink subframe, the uplink subframe, and the special subframe. The configuration of the radio frame of Frame structure Type 2 is indicated by an UpLink-DownLink configuration (UL-DL configuration). The terminal device 1 receives information indicating the UL-DL configuration from the base station device 3. FIG. 3 is a table illustrating one example of the UL-DL configuration, in the present embodiment. In FIG. 3, D denotes a downlink subframe, U denotes an uplink subframe, and S denotes a special subframe.

A configuration of a slot in the present embodiment will be described below.

Figure 4:
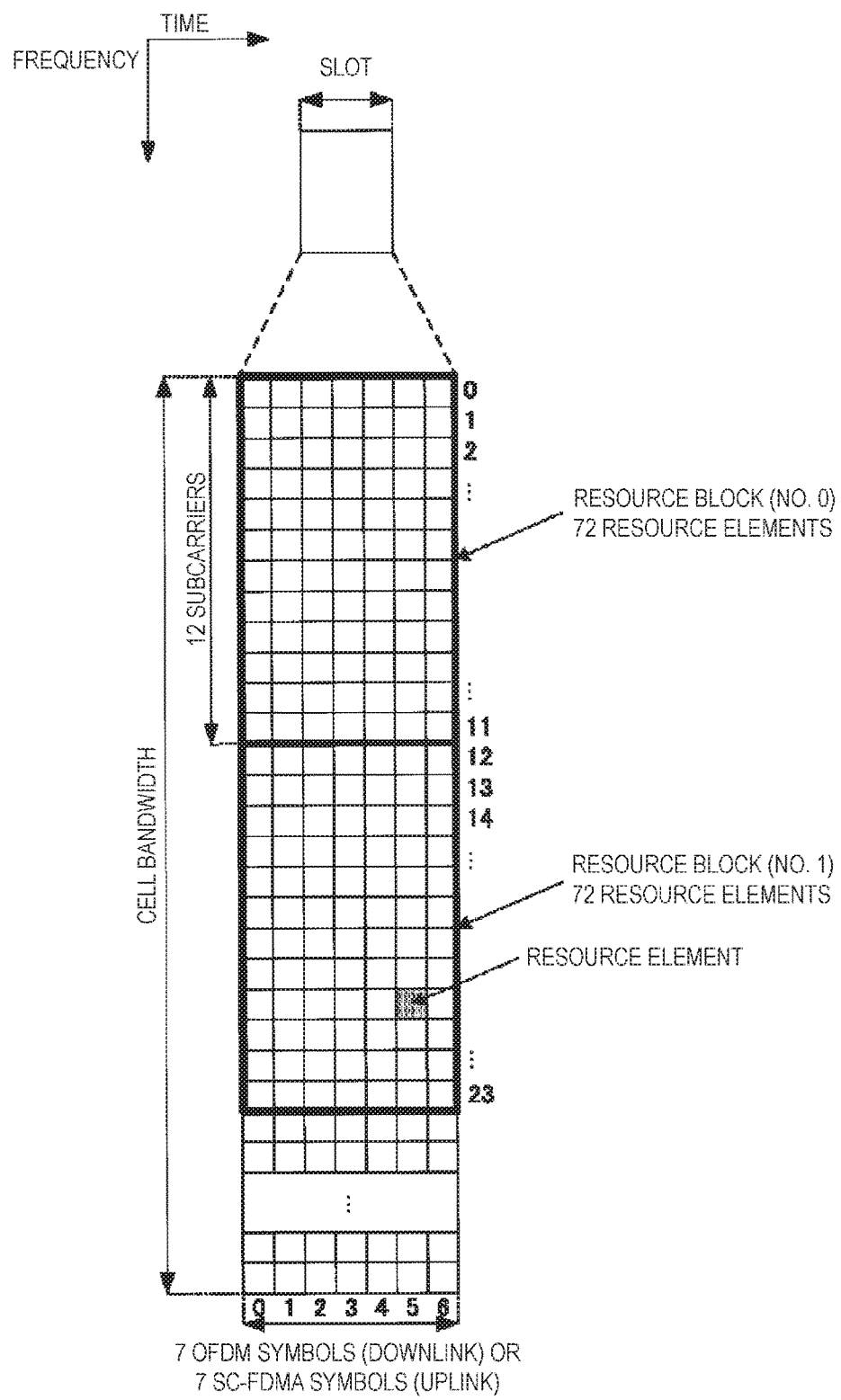
FIG. 4 is a diagram illustrating a configuration of a slot in present embodiment.

FIG. 4 is a diagram illustrating a configuration of a slot in the present embodiment. In the present embodiment, a normal Cyclic Prefix (CP) is applied to an OFDM symbol. Note that an extended Cyclic Prefix (CP) may be applied to the OFDM symbol. The physical signal or the physical channel transmitted in each of the slots is expressed by a resource grid. In FIG. 4, the horizontal axis represents a time axis, and the vertical axis represents a frequency axis. In downlink, the resource grid is defined by multiple subcarriers and multiple OFDM symbols. In uplink, the resource grid is defined by multiple subcarriers and multiple SC-FDMA symbols. The number of subcarriers constituting one slot depends on a cell bandwidth. The number of OFDM symbols or SC-FDMA symbols constituting one slot is seven. Each element within the resource grid is referred to as a resource element. The resource element is identified by a subcarrier number, and an OFDM symbol or SC-FDMA symbol number.

A resource block is used to express mapping of a certain physical channel (such as the PDSCH or the PUSCH) to resource elements. For the resource block, a virtual resource block and a physical resource block are defined. A certain physical channel is first mapped to the virtual resource block. Thereafter, the virtual resource block is mapped to the physical resource block. One physical resource block is defined by seven consecutive OFDM symbols or SC-FDMA symbols in a time domain and by 12 consecutive subcarriers in a frequency domain. Hence, one physical resource block includes (7×12) resource elements. Furthermore, one physical resource block corresponds to one slot in the time domain and corresponds to 180 kHz in the frequency domain. Physical resource blocks are numbered from 0 in the frequency domain.

Hereinafter, narrow bands to be applicable in the present invention will be described.

Figure 5:
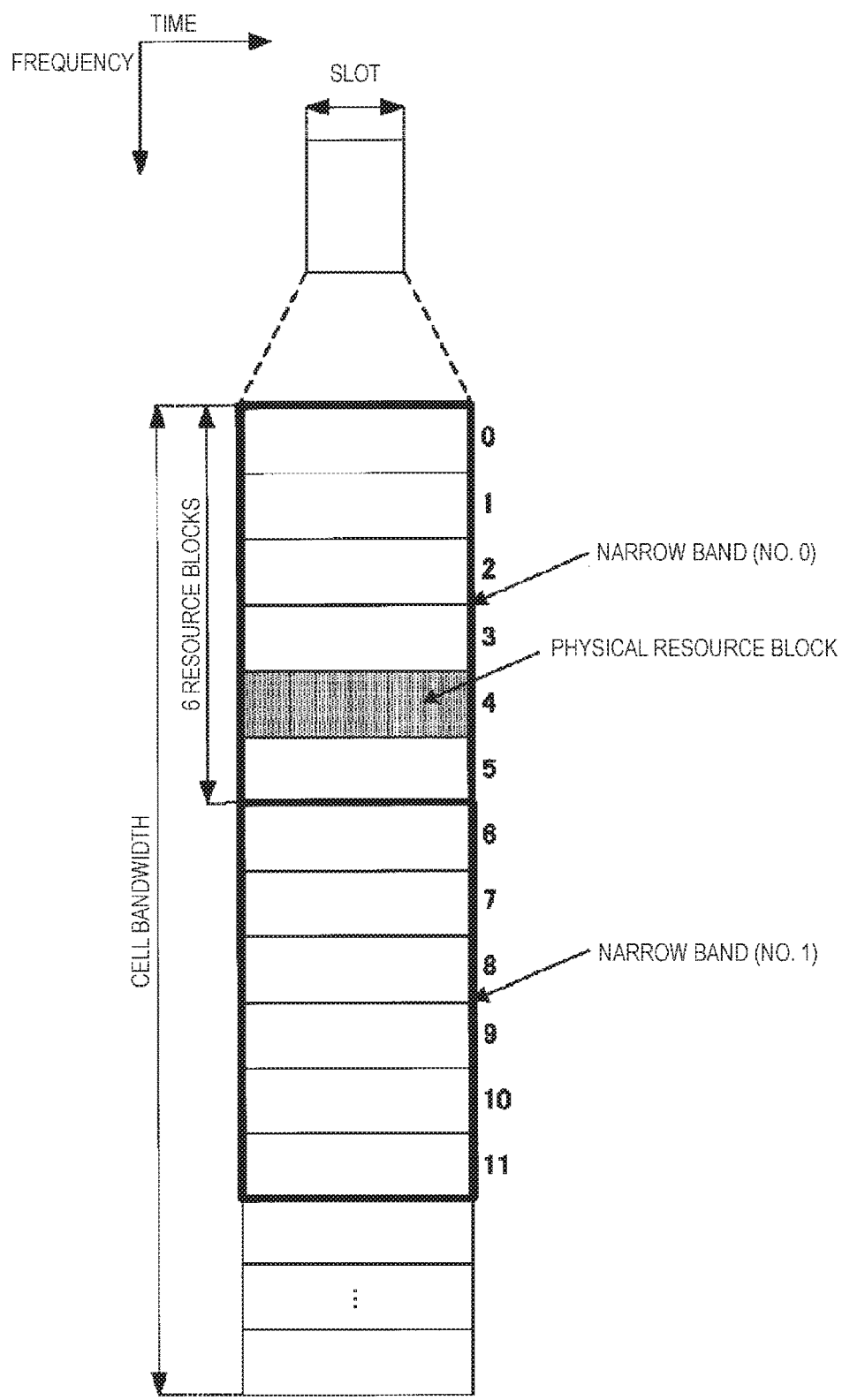
FIG. 5 is a diagram illustrating one example of narrow bands in the present embodiment.

FIG. 5 is a diagram illustrating one example of narrow bands in the present embodiment. In FIG. 5, the horizontal axis represents a time axis, and the vertical axis represents a frequency axis. In a slot, a narrow band is constituted of six consecutive physical resource blocks in the frequency domain. The terminal device 1 is not capable of performing simultaneous reception on multiple different narrow bands in one slot. The terminal device 1 may perform reception on a different narrow band for each of a slot, a subframe, and a subframe set. The terminal device 1 is not capable of performing simultaneous transmission on multiple different narrow bands in one slot. The terminal device 1 may perform transmission on a different narrow band for each of the slot, the subframe, and the subframe set.

The terminal device 1 needs a gap in the time domain to switch narrow bands in which the terminal device 1 performs reception processing. Moreover, the terminal device 1 also needs a gap in the time domain to switch narrow bands in which the terminal device 1 performs transmission processing. For example, when the terminal device 1 performs reception processing in a first narrow band in a subframe n, the terminal device 1 may perform reception processing in a different narrow band from the first narrow band in a subframe n+2 without performing the reception processing in any narrow band in a subframe n+1. In other words, when the terminal device 1 performs the reception processing in the first narrow band in the subframe n, the subframe n+1 may be the gap.

Hereinafter, a search space to be applicable in the present invention will be described. The search space is a set of PDCCH candidates. The PDCCH candidates include resources of one or more subframes.

The terminal device 1 monitors the set of PDCCH candidates in such one or more narrow bands configured through higher layer signaling, for downlink control information. Here, monitoring means an attempt to decode each of the PDCCHs in the set of PDCCH candidates in accordance with a format of the downlink control information to be monitored. In the present embodiment, monitoring the set of PDCCH candidates is also simply referred to as monitoring PDCCHs.

In the present embodiment, "PDCCH candidate" and "MPDCCH candidate" are assumed to mean the same thing. In the present embodiment, "set of PDCCH candidates to be monitored", "set of MPDCCH candidates to be monitored", "search space" "PDCCH search space", "MPDCCH search space", "UE-specific search space", "PDCCH UE-specific search space", and "MPDCCH UE-specific search space" are assumed to mean the same thing.

Figure 6:
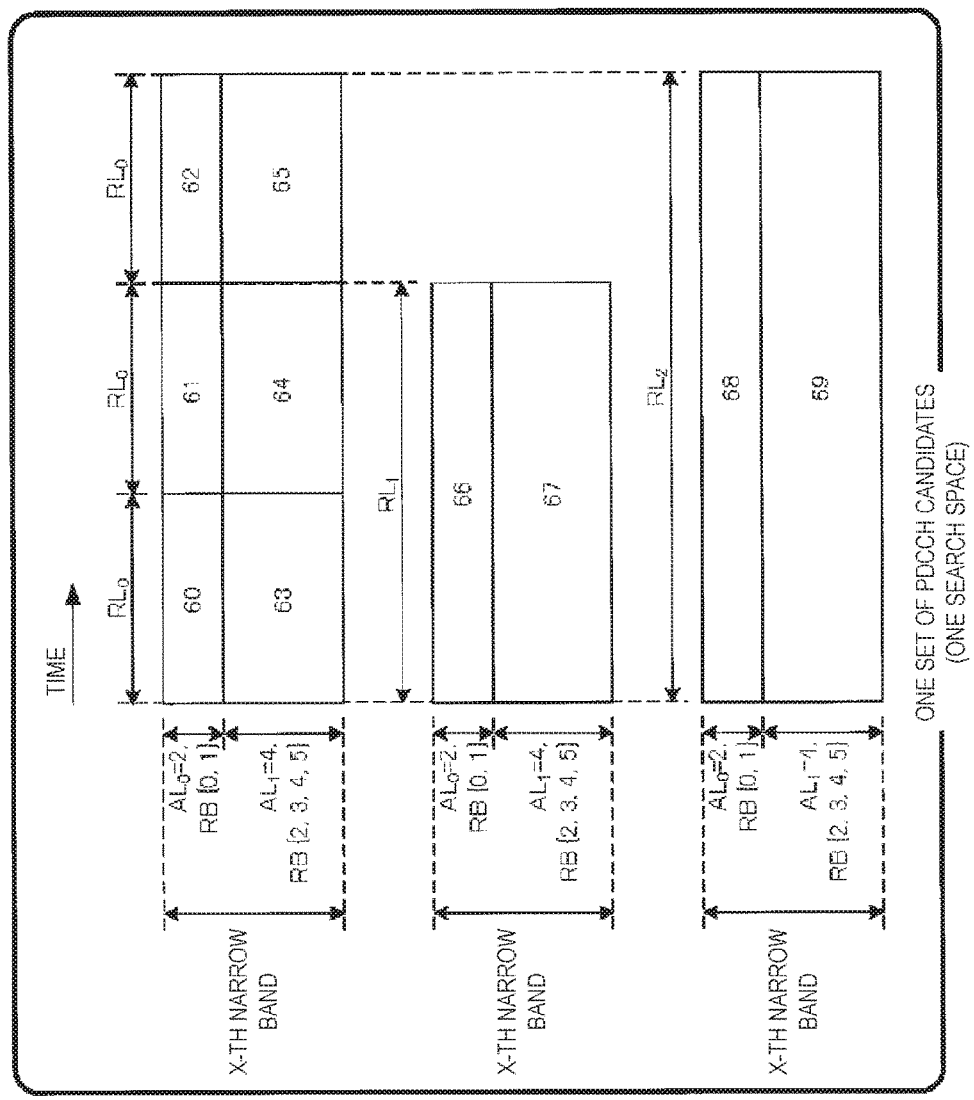
FIG. 6 is a diagram illustrating one example of a search space in the present embodiment.

FIG. 6 is a diagram illustrating one example of a search space in the present embodiment.

In FIG. 6, one search space includes a PDCCH candidate 60 to a PDCCH candidate 69. The PDCCH candidate 60 to the PDCCH candidate 69 are included in an X-th narrow band. In FIG. 6, frequency hopping may be applied to the PDCCH candidates. For example, a narrow band including the PDCCH candidate 60 in a first subframe may be different from another narrow band including the PDCCH candidate 60 in a second subframe. To change a narrow band including a PDCCH candidate, a gap in the time domain (for example, a guard subframe) is needed.

In a slot, the number of resource blocks included in a PDCCH candidate is referred to as Aggregation Level (AL) of the PDCCH candidate. The aggregation level of the PDCCH candidates 60, 61, 62, 66, and 68 is 2 ($AL_0$=2). The aggregation level of the PDCCH candidates 63, 64, 65, 67, and 69 is 4 ($AL_1$=4).

The number of subframes including one PDCCH candidate is referred to as a Repetition Level (RL) of the PDCCH candidate. The repetition level of the PDCCH candidates 60, 61, 62, 63, 64, and 65 is represented by $RL_0$. The repetition level of the PDCCH candidates 66 and 67 is represented by $RL_1$. The repetition level of the PDCCH candidates 68 and 69 is represented by $RL_2$.

Multiple PDCCH candidates included in the same search space may overlap each other. For example, in FIG. 6, the PDCCH candidate 68 overlaps the PDCCH candidates 60, 61, 62, and 66. The multiple subframes including the respective PDCCH candidates 60, 61, 62, and 66 are parts of the multiple subframes including the PDCCH candidate 68. In the frequency domain, two indices of the two resource blocks included in the PDCCH candidates 60, 61, 62, 66, and 68 are identical.

The position (subframes and resource blocks) of the search space in the time domain and/or in the frequency domain may be configured by a higher layer. The position (subframes and resource blocks) of the search space in the time domain and/or in the frequency domain may be configured by the terminal device 1, based on a higher layer message (an RRC message) received from the base station device 3.

The physical channel need not be included in any subframe satisfying a given condition. In the present embodiment, "multiple subframes including a physical channel" and "the number of subframes including a physical channel" may be defined in consideration of the subframe(s) satisfying the given condition, or may be defined without consideration of the subframe(s) satisfying the given condition.

The PDCCH candidates need not be included in any subframe satisfying the given condition. The repetition level of the PDCCH candidate may be defined without consideration of the subframe(s) satisfying the given condition. For example, in a case where a certain PDCCH candidate is included in a subframe 1 to a subframe 10 and two subframes among the subframe 1 to the subframe 10 satisfy a given condition, the repetition level of the certain PDCCH candidate may be 10.

The repetition level of a PDCCH candidate may be defined without consideration of the subframe(s) satisfying the given condition. For example, when a certain PDCCH candidate is included in subframe 1 to subframe 10 and two subframes among subframe 1 to subframe 10 satisfy the given condition, the repetition level of the certain PDCCH candidate may be 8.

For example, the above-described given condition may include some or all of a condition (a) to a condition (d) below.

Condition (a): the subframe is reserved as an MBSFN subframe

Condition (b): in TDD, the subframe is an uplink subframe

Condition (c): the subframe is a gap (a guard subframe) for frequency hopping applied to the PDCCH candidate Condition (d): the subframe is a part of a configured measurement gap Note that conditions included in the above-described given condition are not necessarily limited to the condition (a) to the condition (d), may use conditions different from the condition (a) to the condition (d), or may use some of the condition (a) to the condition (d).

In the present embodiment, "from the X-th subframe" includes the X-th subframe. In the present embodiment, "to the Y-th subframe" includes the Y-th subframe.

Now, Discontinuous Reception (DRX) to be applicable in the present invention will be described.

A DRX functionality is configured by a higher layer (RRC) and processed through MAC. The DRX functionality controls a PDCCH monitoring activity of the terminal device 1 for the C-RNTI and the SPS C-RNTI of the terminal device 1.

In other words, the DRX functionality controls the monitoring activity of the terminal device 1 for the PDCCH to be used to transmit a DCI format, to which the SPS C-RNTI of the terminal device 1 or CRC parity bits scrambled with the C-RNTI are attached.

With the configured DRX, the terminal device 1 may discontinuously monitor the PDCCHs through a DRX operation to be described below. In other cases, the terminal device 1 may continuously monitor PDCCHs.

The higher layer (RRC) controls the DRX operation by configuring the following multiple timers and a drxStartOffset value. Whether to configure a drxShortCycleTimer and a shortDRX-Cycle is optional for the higher layer (RRC).

onDurationTimer
drx-InactivityTimer
drx-RetransmissionTimer (one for each of downlink HARQ processes except for a downlink HARQ process corresponding to a broadcast process)
longDRX-Cycle
HARQ Round Trip Time (RTT) timer (one for each downlink HARQ process)
drxShortCycleTimer (optional)
shortDRX-Cycle (optional)

The base station device 3 may transmit, to the terminal device 1, an RRC message including parameters/information indicating onDurationTimer, drx-InactivityTimer, drx-RetransmissionTimer, longDRX-Cycle, drxShortCycleTimer, shortDRX-Cycle, and the value of drxStartOffset.

The terminal device 1 may set onDurationTimer, drx-InactivityTimer, drx-RetransmissionTimer, longDRX-Cycle, drxShortCycleTimer, shortDRX-Cycle, and the value of drxStartOffset, based on the received RRC message.

longDRX-Cycle and shortDRX-Cycle are also collectively referred to as a DRX cycle.

onDurationTimer indicates the number of consecutive PDCCH subframes from the start of a DRX cycle.

drx-InactivityTimer indicates the number of consecutive PDCCH subframes subsequent to the subframe, to which the PDCCH indicating initial transmission of uplink data or downlink data to the terminal device 1 is mapped.

drx-RetransmissionTimer indicates the maximum number of consecutive PDCCH subframes for downlink retransmission expected by the terminal device 1. The same value of drx-RetransmissionTimer is applied to all serving cells.

The DRX cycle indicates an On Duration iteration cycle. An on-duration period is followed by a period in which a PDCCH monitoring inactivity of the terminal device 1 for a C-RNTI and an SPS C-RNTI of the terminal device 1 is enabled.

Figure 7:
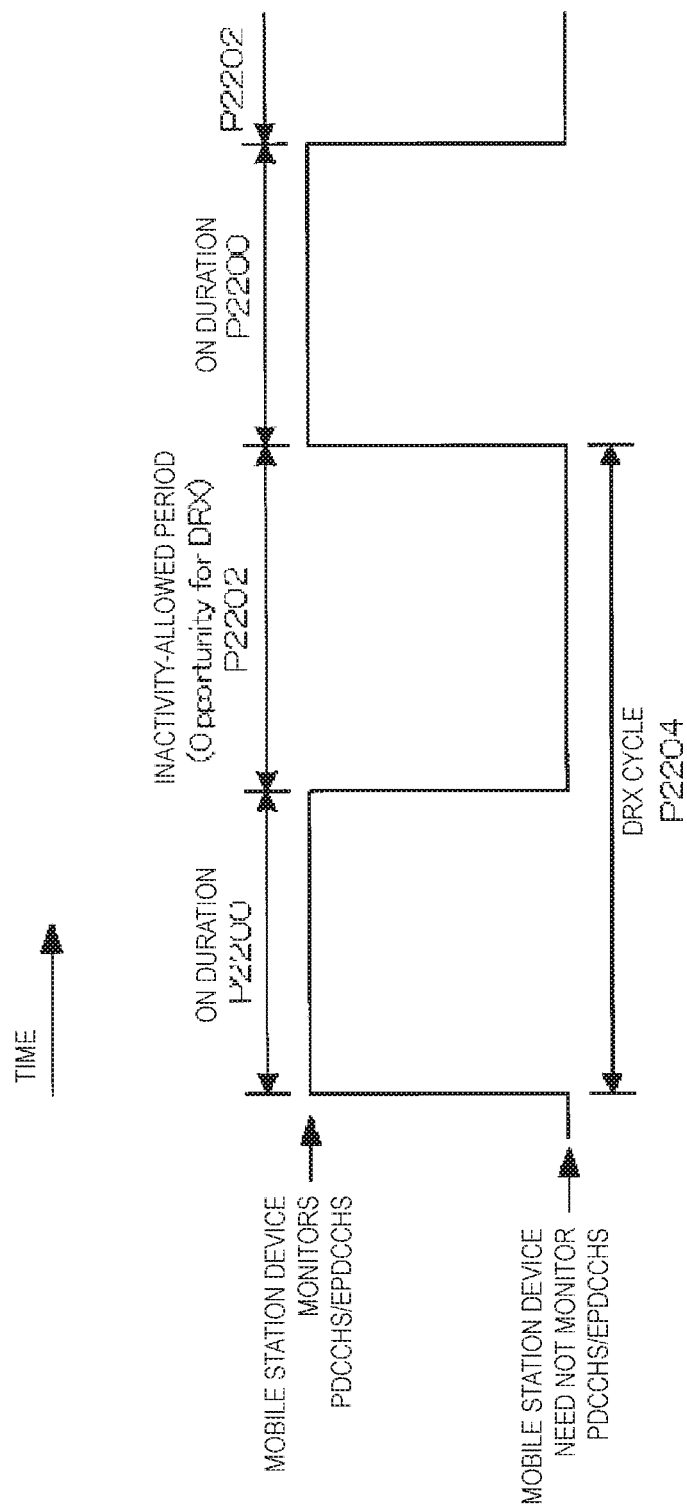
FIG. 7 is a diagram illustrating one example of a DRX cycle in the present embodiment.

FIG. 7 is a diagram illustrating one example of the DRX cycle in the present embodiment. In FIG. 7, the horizontal axis represents a time axis. In FIG. 7, the terminal device 1 monitors PDCCHs in an on-duration period P2200. In FIG. 7, a period P2202 subsequent to the on-duration period P2200 is an inactivity-allowed period. In other words, in FIG. 7, the terminal device 1 may not monitor PDCCHs in the period P2202.

drxShortCycleTimer indicates the number of consecutive subframes in which the terminal device 1 follows a short DRX cycle.

drxStartOffset indicates a subframe in which the DRX cycle starts.

An HARQ RTT timer corresponding to a downlink HARQ process relates to the start of a drx-RetransmissionTimer and is managed for each downlink HARQ process. The HARQ RTT timer corresponding to a downlink HARQ process indicates the minimum interval from transmission of downlink data to retransmission of the downlink data. In other words, the HARQ RTT timer corresponding to the downlink HARQ process indicates the minimum number of subframes prior to downlink HARQ retransmission expected by the terminal device 1.

Note that, in the present embodiment, one downlink HARQ process controls the HARQ of one piece of downlink data (a transport block). Alternatively, one downlink HARQ process may control two pieces of downlink data.

For example, when the DRX cycle is configured, an Active Time may include a period satisfying at least one of a condition (e) to a condition (i) below.

Condition (e): onDurationTimer, drx-InactivityTimer, drx-RetransmissionTimer, or mac-ContentionResolutionTimer is running Condition (f): a scheduling request is transmitted on a PUCCH and is pending Condition (g): there is a possibility that an uplink grant for pending HARQ retransmission is transmitted for synchronous HARQ, and the corresponding HARQ buffer holds data Condition (h): after successful reception of a random access response for a preamble that is not selected by the terminal device 1, a PDCCH, which is accompanied with the C-RNTI of the terminal device 1 and which indicates that initial transmission has not been received Condition (i): the terminal device 1 is monitoring PDCCH candidates included in multiple subframes.

Note that the conditions used to determine whether a certain period is included in an Active Time are not limited to the condition (e) to the condition (i), may use conditions different from the condition (e) to the condition (i), or may use some of the condition (e) to the condition (i).

Once a timer starts, the timer keeps running until the timer is stopped or the timer expires. In other cases, the timer is not running. When the timer is not running, the timer has a possibility of being started. When the timer is running, the timer has a possibility of being restarted. The timer is always started or restarted from an initial value of the timer.

The preamble serves as a message 1 in a random access procedure, and is transmitted on a PRACH. The preamble that is not selected by the terminal device 1 relates to a contention based random access procedure.

The random access response serves as a message 2 in the random access procedure, and is transmitted on a PDSCH. The base station device 3 transmits a random access response to the received preamble.

The terminal device 1 performing the contention based random access procedure transmits a message 3 after the reception of the random access response. The terminal device 1 monitors a PDCCH relating to a message 4 after the transmission of the message 3.

mac-ContentionResolutionTimer indicates the number of consecutive subframes in which the terminal device 1 monitors the PDCCH after the transmission of the message 3.

Figure 8:
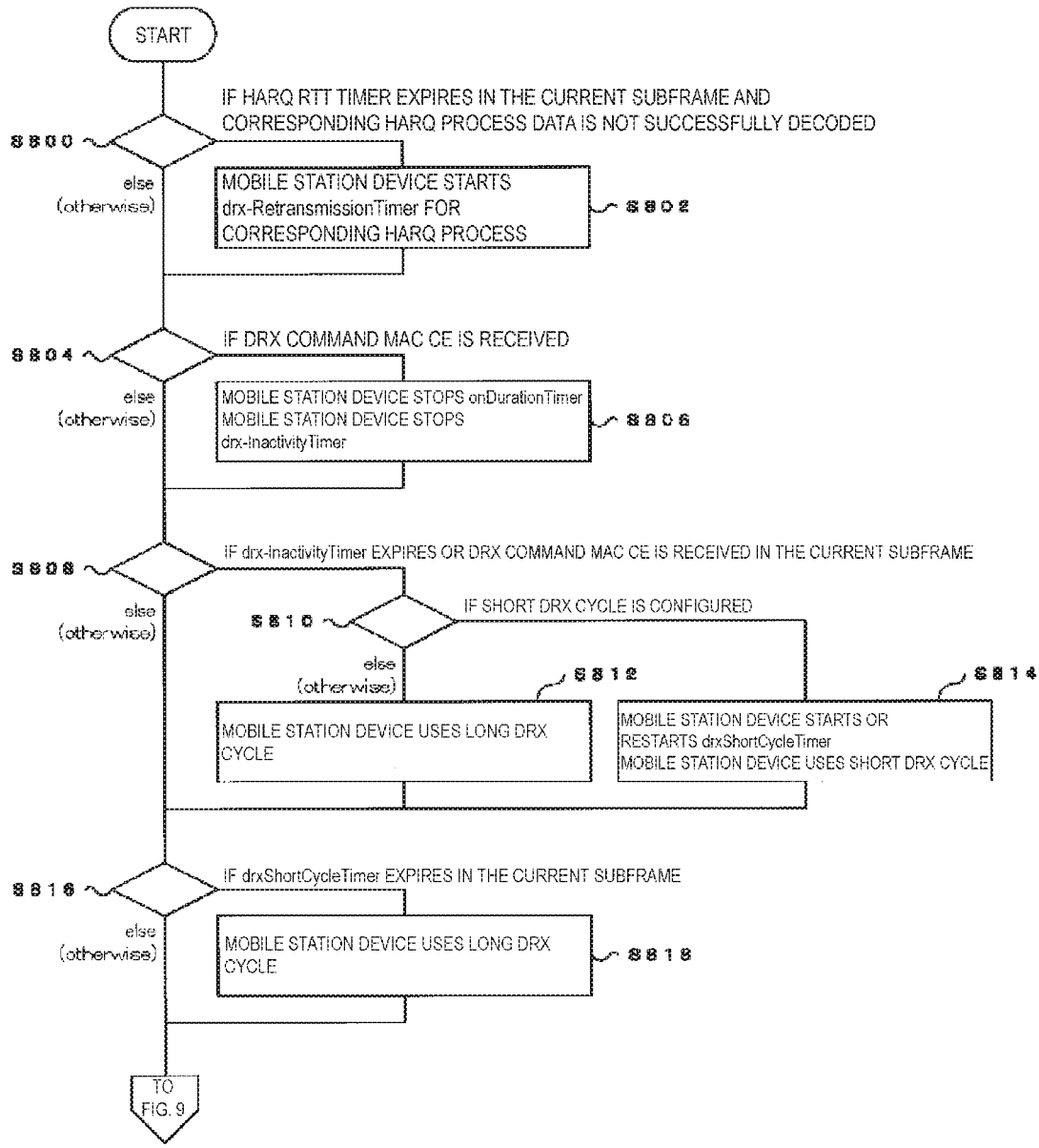
FIG. 8 is a flowchart illustrating one example of a DRX operation in the present embodiment.
Figure 9:
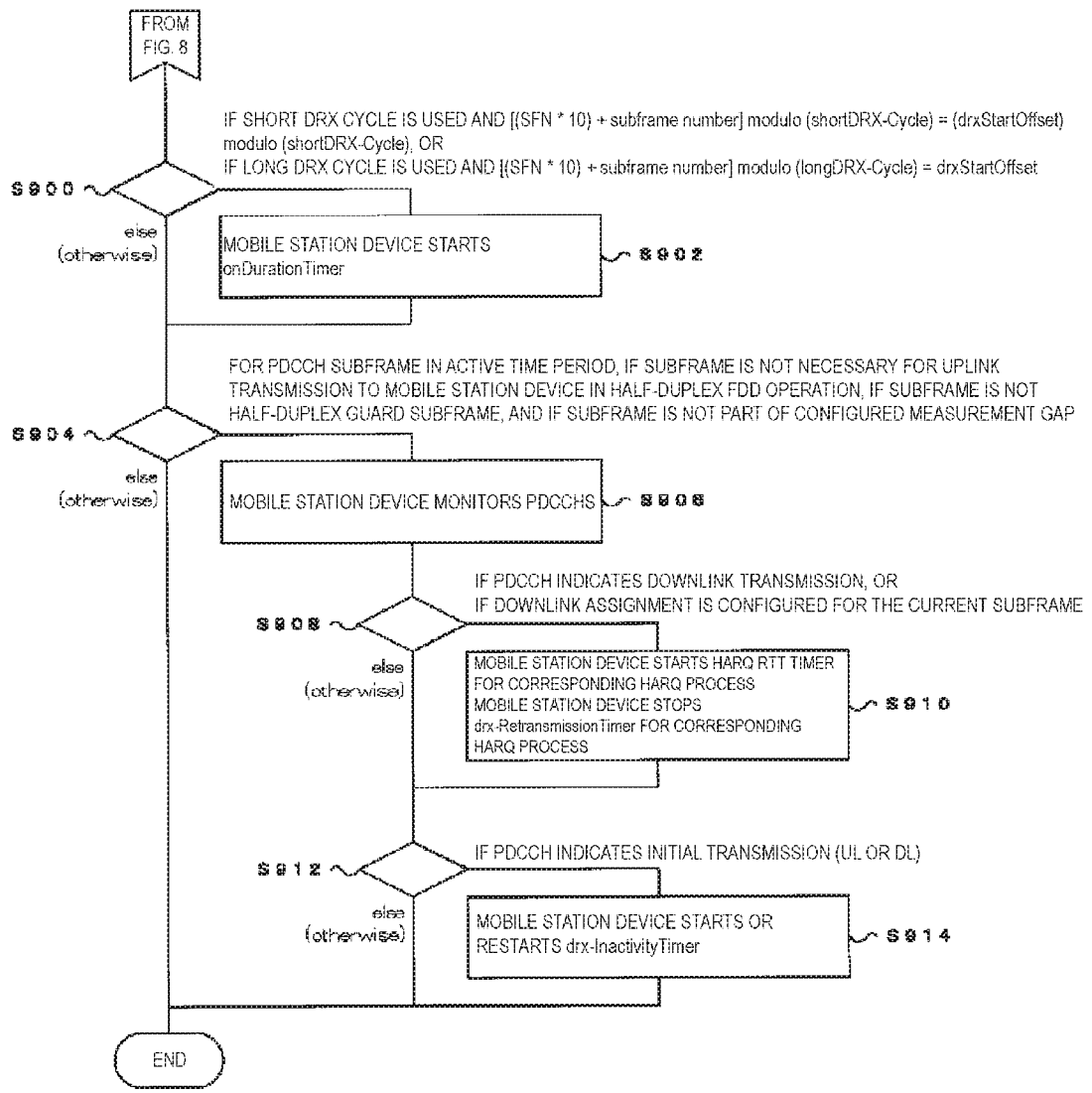
FIG. 9 is a flowchart illustrating the one example of the DRX operation in the present embodiment.

FIG. 8 and FIG. 9 are flowcharts illustrating one example of the DRX operation in the present embodiment. When the DRX is configured, the terminal device 1 performs the DRX operation for each of the subframes according to the flowcharts in FIG. 8 and FIG. 9.

If a HARQ RTT timer corresponding to the downlink HARQ process in the current subframe expires and the data of the HARQ process corresponding to the HARQ RTT timer is not decoded successfully (S800), the terminal device 1 starts a drx-RetransmissionTimer for the downlink HARQ process corresponding to the HARQ RTT timer (S802) and processing goes to S804. Otherwise (S800), processing of the terminal device 1 goes to S804.

If a DRX command MAC CE is received (S804), the terminal device 1 stops an onDurationTimer and a drx-InactivityTimer (S806), and processing goes to S808. Otherwise (S804), processing of the terminal device 1 goes to S808.

If the drx-InactivityTimer expires or a DRX command MAC CE is received in the current subframe (S808), processing of the terminal device 1 goes to S810. Otherwise (S808), processing of the terminal device 1 goes to S816.

If a short DRX cycle is not configured (S810), the terminal device 1 uses a long DRX cycle (S812), and processing goes to S816. If the short DRX cycle is configured (S810), the terminal device 1 starts or restarts a drxShortCycleTimer to use the short DRX cycle (S814) and processing goes to S816.

If the drxShortCycleTimer expires in the current subframe (S816), the terminal device 1 uses the long DRX cycle (S818) and processing goes to S900 in FIG. 9. Otherwise (S816), processing of the terminal device 1 goes to S900 in FIG. 9.

(1) If the short DRX cycle is used and [(SFN*10)+subframe number] modulo (shortDRX-Cycle)=(drxStartOffset) modulo (shortDRX-Cycle), or (2) if the long DRX cycle is used and [(SFN*10)+subframe number] modulo (longDRX-Cycle)=drxStartOffset (S900), the terminal device 1 starts an onDurationTimer (S902) and processing goes to S904. Otherwise (S900), processing of the terminal device 1 goes to S904.

If all conditions (j) to (n) below are satisfied (S904), the terminal device 1 monitors the PDCCH in the current subframe (906) and processing goes to S908.

Condition (j): the current subframe is included in an Active Time period

Condition (k): the current subframe is a PDCCH subframe

Condition (l): the current subframe is not necessary for uplink transmission to the terminal device 1 in a half-duplex FDD operation Condition (m): the subframe is not a half-duplex guard subframe Condition (n): the current subframe is not a part of a configured measurement gap For one FDD serving cell, all subframes are PDCCH subframes. The terminal device 1 and the base station device 3 identify a PDCCH subframe for a TDD serving cell, based on the UL-DL configuration. The terminal device 1 for communicating with the base station device 3 through one TDD serving cell, and the base station device 3 identify (select or determine), as a PDCCH subframe, the subframe indicated as a downlink subframe or a subframe including DwPTS in the UL-DL configuration corresponding to the serving cell.

The half-duplex FDD operation includes a type A half-duplex FDD operation and a type B half-duplex FDD operation. The terminal device 1 may transmit information indicating whether to support the type A half-duplex FDD in the FDD band, to the base station device 3. The terminal device 1 may transmit information indicating whether to support the type B half-duplex FDD in the FDD band, to the base station device 3.

In the type A half-duplex FDD operation, the terminal device 1 is not capable of performing uplink transmission and downlink reception simultaneously.

In the type B half-duplex FDD operation, a subframe immediately before the subframe in which the terminal device 1 performs uplink transmission and a subframe immediately after the subframe in which the mobile station device 1 performs uplink transmission are each a half-duplex guard subframe.

In the type B half-duplex FDD operation, the terminal device 1 is not capable of performing uplink transmission and downlink reception simultaneously. In the type B half-duplex FDD operation, the terminal device 1 is not capable of performing downlink reception in a subframe immediately before the subframe in which the terminal device 1 performs uplink transmission. For the type B half-duplex FDD operation, the terminal device 1 is not capable of performing downlink reception in a subframe immediately after the subframe in which the terminal device 1 performs uplink transmission.

The measurement gap is a time interval for the terminal device 1 to perform measurements of cells operating on different frequencies and/or operating in different Radio Access Technologies (RATs). The base station device 3 transmits information indicating the period of the measurement gap to the terminal device 1. The terminal device 1 configures the period of the measurement gap, based on the information.

If at least one of the conditions (j) to (n) is not satisfied (S904), the terminal device 1 terminates the DRX operation for the current subframe. In other words, when at least one of the conditions (j) to (n) is not satisfied, the terminal device 1 need not monitor the PDCCH in the current subframe.

Note that the conditions used in S904 are not limited to the condition (j) to the condition (n). In S904, conditions different from the condition (j) to the condition (n) or some of the condition (j) to the condition (n) may be used.

If the downlink assignment received via the PDCCH indicates downlink transmission or if a downlink assignment is configured for the current subframe (S908), the terminal device 1 starts the HARQ RTT timer for the corresponding downlink HARQ process and stops a drx-Retransmission-Timer for the corresponding downlink HARQ process (S910). Otherwise (S908), processing of the terminal device 1 goes to S912.

The state in which a downlink assignment is configured denotes a state in which semi persistent scheduling is activated by the downlink assignment along with an SPS C-RNTI.

If the downlink assignment or the uplink grant received via the PDCCH indicates initial downlink or uplink transmission (S914), the terminal device 1 starts or restarts the drx-InactivityTimer (S914) and terminates the DRX operation for the current subframe. Otherwise (S912), the terminal device 1 terminates the DRX operation for the current subframe.

The terminal device 1 configured with DRX does not transmit any periodic SRS when not in the Active Time.

Figure 10:
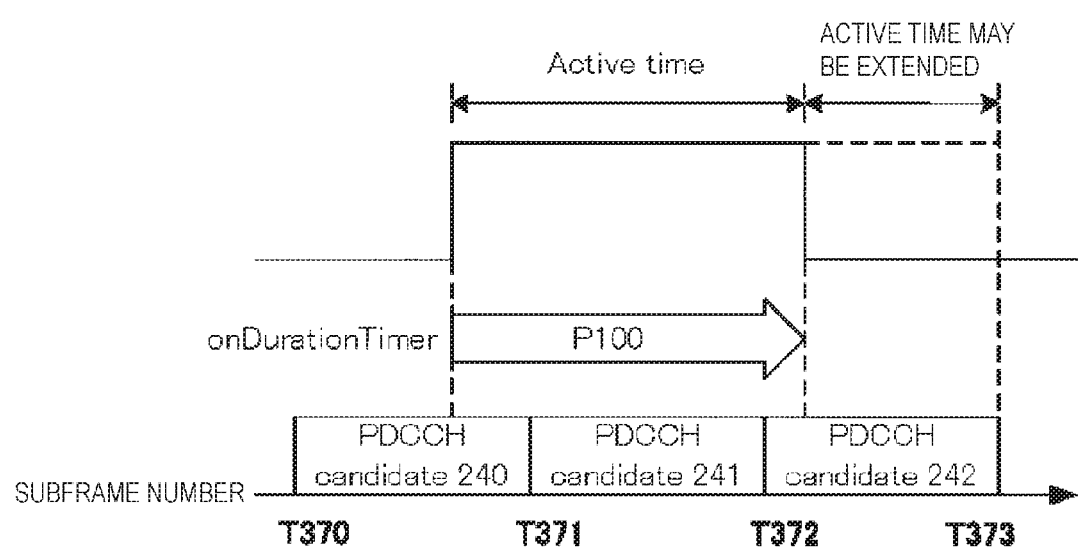
FIG. 10 is a diagram illustrating one example of monitoring PDCCH candidates in the present embodiment.

FIG. 10 is a diagram illustrating one example of monitoring PDCCH candidates in the present embodiment.

Some of the multiple subframes including a PDCCH candidate 240 are not included in the Active Time, and the other subframes are included in the Active Time. A first subframe (T370) of the multiple subframes including the PDCCH candidate 240 is not included in the Active Time. The terminal device 1 need not monitor the PDCCH candidate 240, based on the fact that the first subframe (T370) of the multiple subframes including the PDCCH candidate 240 is not included in the Active Time.

All the multiple subframes including a PDCCH candidate 241 are included in the Active Time. The first subframe (T371) of the multiple subframes including the PDCCH candidate 241 is not included in the Active Time. The terminal device 1 may monitor the PDCCH candidate 241, based on the fact that the first subframe (T371) of the multiple subframes including the PDCCH candidate 241 is included in the Active Time.

The first subframe (T372) of the multiple subframes including a PDCCH candidate 242 is included in the Active Time. The terminal device 1 may monitor the PDCCH candidate 242, based on the fact that the first subframe (T372) of the multiple subframes including the PDCCH candidate 242 is included in the Active Time. Here, in a case where the subframe (T372) is included in the Active Time at the time of the subframe (T372), the Active Time may include multiple subframes including the PDCCH candidate 242.

Figure 11:
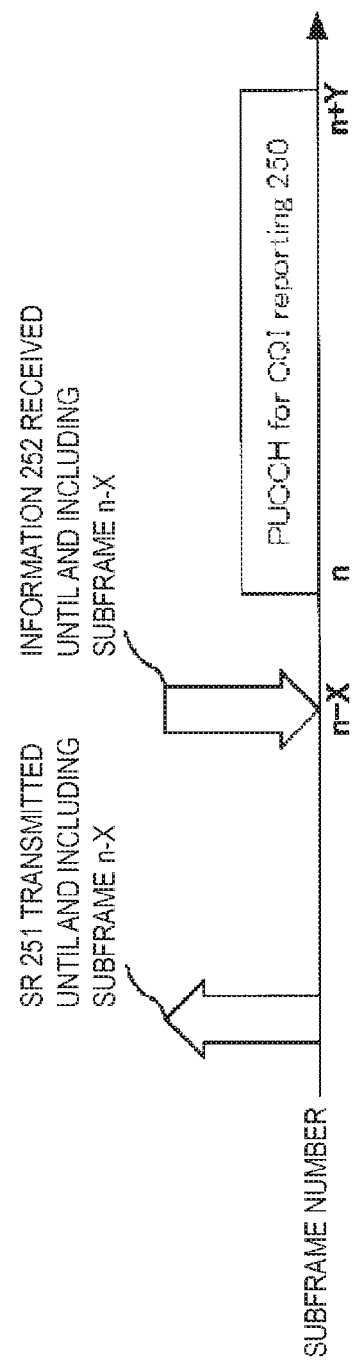
FIG. 11 is a diagram illustrating one example of transmission on a PUCCH in the present embodiment.

FIG. 11 is a diagram illustrating one example of PUCCH transmission in the present embodiment.

In FIG. 11, a PUCCH 250 is included in a subframe n to a subframe n+Y. The PUCCH 250 is used for periodic CQI reporting. The terminal device 1 may receive information indicating the PUCCH resources to be used for the periodic CQI reporting, from the base station device 3. The information indicating the PUCCH resource to be used for the periodic CQI reporting may indicate at least the subframe to which the PUCCH to be used for the periodic CQI reporting is allocated.

In FIG. 11, the terminal device 1 transmits a scheduling request 251, and receives information 252 until and including a subframe n−X. The information 252 may include a downlink assignment, an uplink grant, and a DRX command MAC CE.

The terminal device 1 may receive, from the base station device 3, information (RRC message) indicating that the terminal device 1 performs setup or release of a higher layer parameter/CQI-mask.

In a case where the higher layer parameter/CQI-mask is not configured by a higher layer and a subframe n is assumed not to be included in the Active Time in consideration of the scheduling request 251 which has been transmitted and/or the information 252 which has been received until and including a subframe n−X, the terminal device 1 may not report the CQI on the PUCCH 250 included in the subframe n to the subframe n+Y, irrespective of whether the subframe n+1 to the subframe n+Y are included in the Active Time.

The value X may be defined beforehand in a specification, for example. For example, X is 5.

In a case where the higher layer parameter/CQI-mask is not configured by a higher layer and the subframe n is assumed to be included in the Active Time in consideration of the scheduling request 251 which has been transmitted and/or the information 252 which has been received until and including the subframe n−X, the terminal device 1 may report the CQI on the PUCCH 250 included in the subframe n to the subframe n+Y irrespective of whether the subframe n+1 to the subframe n+Y are included in the Active Time.

In a case where the higher layer parameter/CQI-mask is configured by a higher layer and an onDurationTimer is assumed not to be running in the subframe n in consideration of the scheduling request 251 which has been transmitted and/or the information 252 which has been received until and including the subframe n−X, the terminal device 1 may not report the CQI on the PUCCH 250 included in the subframe n to the subframe n+Y irrespective of whether the onDurationTimer is running in the subframe n+1 to the subframe n+Y.

In a case where the higher layer parameter/CQI-mask is configured by a higher layer and the onDurationTimer is assumed to be running in the subframe n in consideration of the scheduling request 251 which has been transmitted and/or the information 252 which has been received until and including the subframe n−X, the terminal device 1 may report the CQI on the PUCCH 250 included in the subframe n to the subframe n+Y irrespective of whether the onDurationTimer is running in the subframe n+1 to the subframe n+Y.

The terminal device 1 may apply any one of the above-described examples to CQI reporting on the PUCCH 250 irrespective of whether the higher layer parameter/CQI-mask is configured by a higher layer.

The terminal device 1 transmits a HARQ-ACK on the PUCCH included in a subframe m to a subframe m+Z irrespective of whether some or all of the subframe m to the subframe m+Z are included in the Active Time and whether the onDurationTimer is running in some or all of the subframe m to the subframe m+Z.

Hereinafter, a method for setting a drx-InactivityTimer and a HARQ RTT timer in the present embodiment will be described in detail.

Figure 12:
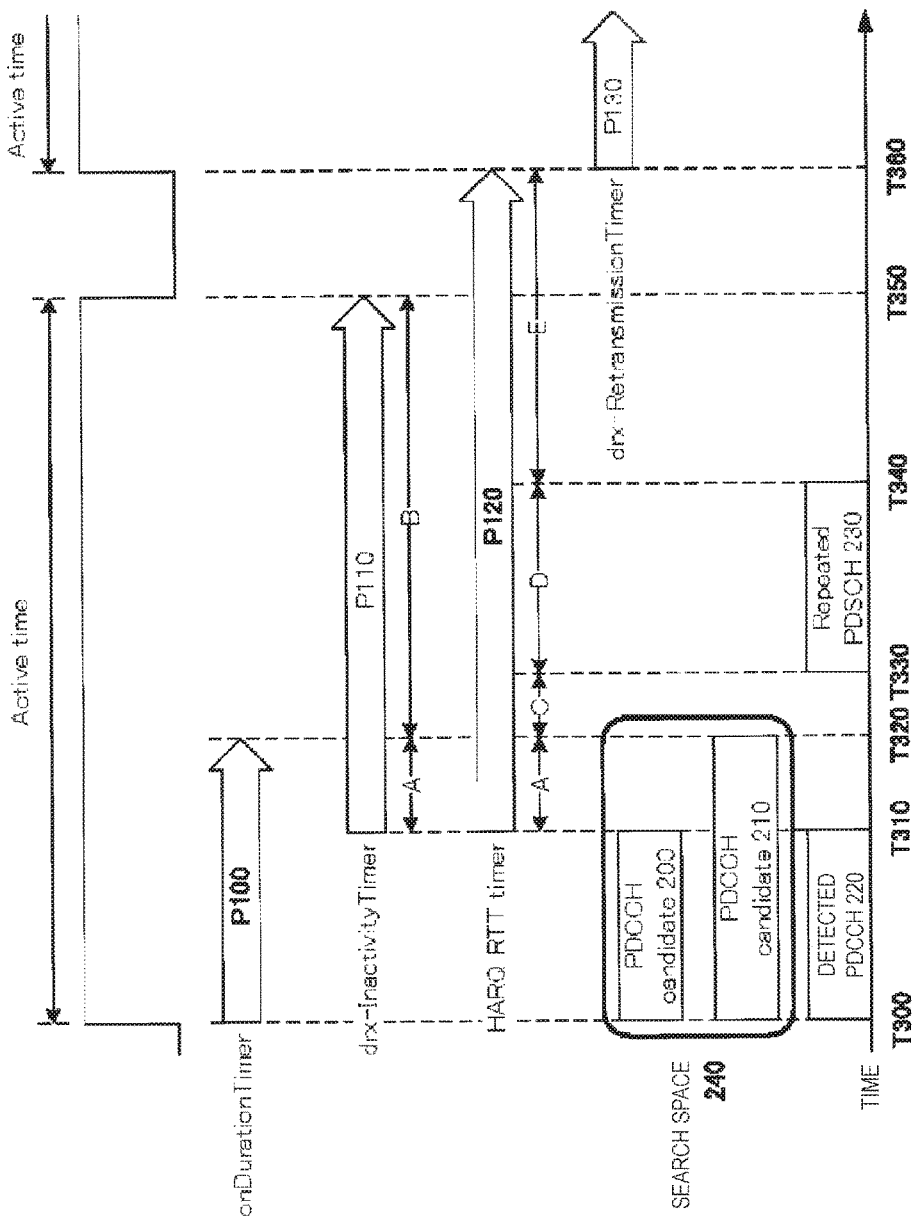
FIG. 12 is a diagram illustrating one example of a method for setting a drx-InactivityTimer and an HARQ RTT timer in the present embodiment.
Figure 13:
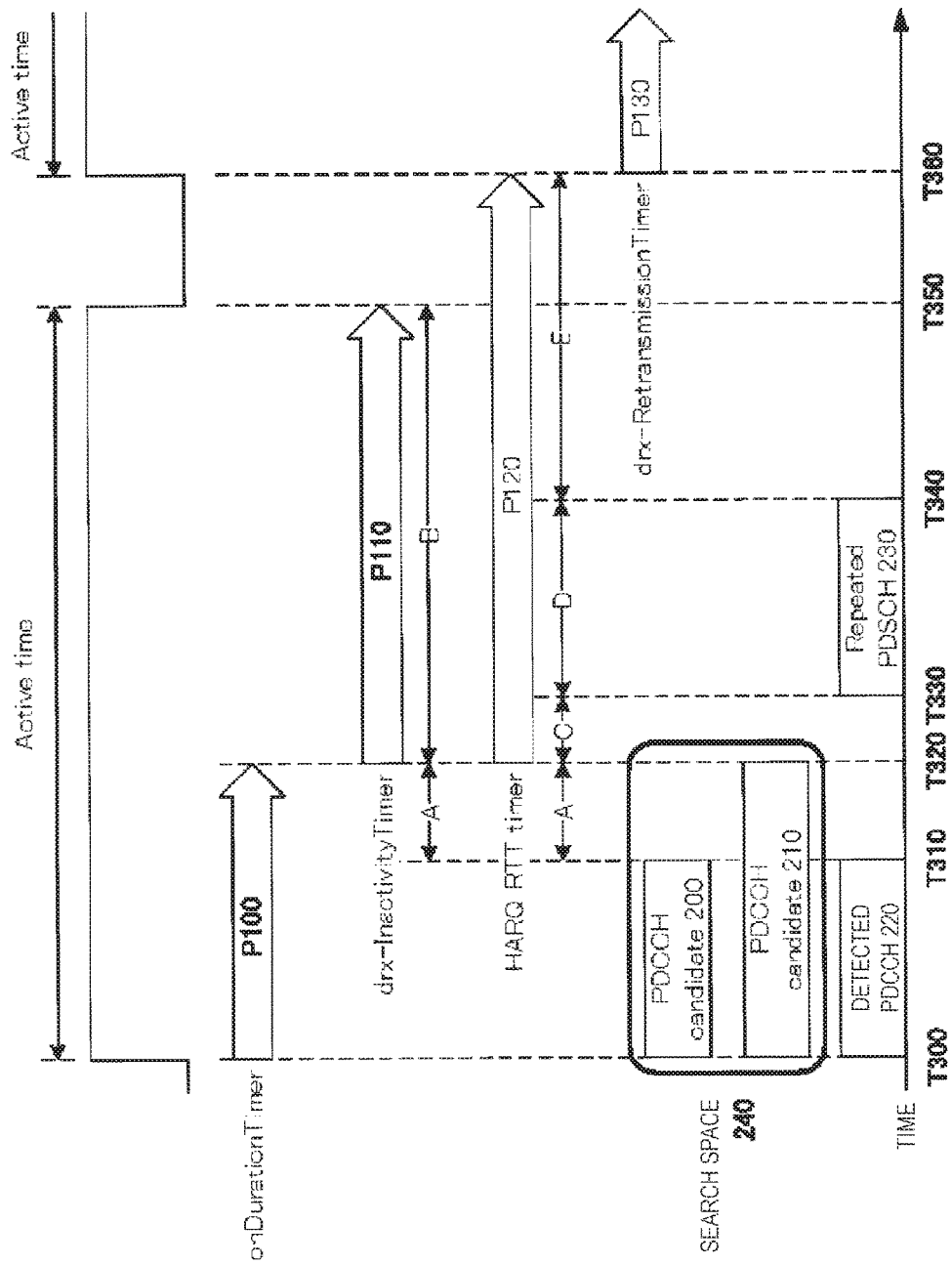
FIG. 13 is a diagram illustrating another example of the method for setting the drx-InactivityTimer and the HARQ RTT timer in the present embodiment.

FIG. 12 is a diagram illustrating one example of a method for setting the drx-InactivityTimer and the HARQ RTT timer in the present embodiment. FIG. 13 is a diagram illustrating another example of the method for setting a drx-InactivityTimer and a HARQ RTT timer in the present embodiment. Note that the example in FIG. 12 and the example in FIG. 13 may be applied to only one of the drx-InactivityTimer and the HARQ RTT timer. Alternatively, different examples may be applied to the drx-InactivityTimer and the HARQ RTT timer.

In FIG. 12 and FIG. 13, P100 indicates a period while an onDurationTimer is running, P110 indicates a period while a drx-InactivityTimer is running, P120 indicates a period while the HARQ RTT timer is running, and P130 indicates a period while the drx-RetransmissionTimer is running. A PDCCH candidate 200 is included in a first subframe (a time point T300) to a second subframe (a time point T310), and a PDCCH candidate 210 is included in the first subframe (the time point T300) to the second subframe (the time point T320). The terminal device 1 monitors a search space 240 including the PDCCH candidate 200 and the PDCCH candidate 210. Other PDCCH candidates different from the PDCCH candidates 200 and 210 may be included in the search space 240. Note that the PDCCH candidate 210 has the highest repetition level among the multiple PDCCH candidates included in the search space 240.

The terminal device 1 detects a PDCCH 220 from the first subframe (the time point T300) to the second subframe (the time point T310). In FIG. 12 and FIG. 13, the terminal device 1 decodes a PDSCH 230 included in a fourth subframe (a time point T330) to a fifth subframe (a time point T340), based on the detection of the PDCCH 220. The multiple subframes (the fourth subframe and/or the fifth subframe) including the PDSCH 230 may be given by the information included in the PDCCH 220 and/or in the higher layer parameter (an RRC message). The number of subframes including the PDSCH 230 may be given by the information included in the PDCCH 220 and/or in the higher layer parameter (the RRC message).

In FIG. 12, in the last subframe of the subframes including the detected PDCCH 220 or the next subframe of the last subframe, the terminal device 1 (i) sets the drx-InactivityTimer at the sum of A and B, (ii) starts the drx-InactivityTimer, (iii) sets the HARQ RTT timer at the sum of A, C, D, and E, and (iv) starts the HARQ RTT timer.

In FIG. 13, in the last subframe of the subframes including the PDCCH 210 having the highest repetition level among the multiple PDCCH candidates included in the search space 240, in which the PDCCH 220 has been detected, or in the next subframe of the last subframe, the terminal device 1 (i) sets the drx-InactivityTimer at B, (ii) starts the drx-InactivityTimer, (iii) sets the HARQ RTT timer at the sum of C, D, and E, and (iv) starts the HARQ RTT timer.

In FIG. 12 and FIG. 13, when the terminal device 1 detects a PDCCH in the PDCCH candidate 210, the terminal device 1 (i) sets the drx-InactivityTimer at B, (ii) starts the drx-InactivityTimer, (iii) sets the HARQ RTT timer at the sum of C, D, and E, and (iv) starts the HARQ RTT timer, in the last subframe of the subframes including the detected PDCCH 210 or in the next subframe of the last subframe.

The value A is given by (i) the difference between the number of subframes including the detected PDCCH 220 and the number of subframes including the PDCCH candidate 210, (ii) the difference between the number of subframes including the PDCCH candidates 200, in which the PDCCH 220 is detected, and the number of subframes including the PDCCH candidate 210, (iii) the difference between the repetition level of the PDCCH candidate 200 and the repetition level of the PDCCH candidate 210, or (iv) the difference between the last subframe including the detected PDCCH 220 and the last subframe including the PDCCH candidate 210.

The value B is given by a higher layer. The value B is given by a higher layer parameter. The terminal device 1 may receive the higher layer parameter used to indicate the value B, from the base station device 3.

The value C may be defined beforehand in a specification, for example. For example, C is 0 or 1. The value C may be given by the information included in the detected PDCCH 220 and/or a higher layer parameter.

The value D is the number of subframes including the PDSCH 230. In other words, the value D may be given by the information included in the PDCCH 220 and/or a higher layer parameter (an RRC message). The information on the value D, out of the information included in the PDCCH 220, may be the same as or different from the information on the value C.

The value E is given by a higher layer. The value E is given by a higher layer parameter. The terminal device 1 may receive the higher layer parameter used to indicate the value E, from the base station device 3.

In a case where the PDCCH candidate 200 and the PDCCH candidate 210 overlap each other and the base station device 3 transmits the PDCCH candidate 210 on the PDCCH candidate 220, the terminal device 1 is capable of detecting the PDCCH 220 in both the PDCCH candidate 200 and the PDCCH candidate 210. In this case, the terminal device 1 is not capable of identifying which one of the PDCCH candidate 200 and the PDCCH candidate 210 has transmitted the detected PDCCH 220.

However, in the example in FIG. 12 and in the example in FIG. 13, when the terminal device 1 detects the PDCCH 220 in the PPDCCH candidate 200, and also when the terminal device 1 detects the PDCCH 220 in the PDCCH candidate 210, the drx-InactivityTimer expires in an identical subframe (a time point T350), and the HARQ RTT timer expires in an identical subframe (a time point T360). Hence, even in a case where the terminal device 1 fails to identify which one of the PDCCH candidate 200 and the PDCCH candidate 210 has transmitted the detected PDCCH 220 by using the method in the example in FIG. 12 and the example in FIG. 13, the base station device 3 is capable of learning the state of the drx-InactivityTimer and/or the HARQ RTT timer in the terminal device 1 with accuracy, by the terminal device 1 using the example in FIG. 12 or the example in FIG. 13 and by the base station device 3 assuming that the terminal device 1 is using the example in FIG. 12 or the example in FIG. 13. With this configuration, the base station device 3 is capable of efficiently controlling the DRX of the terminal device 1, and the terminal device 1 and the base station device 3 is capable of communicating with each other efficiently.

Now, configurations of devices in the present embodiment will be described below.

Figure 14:
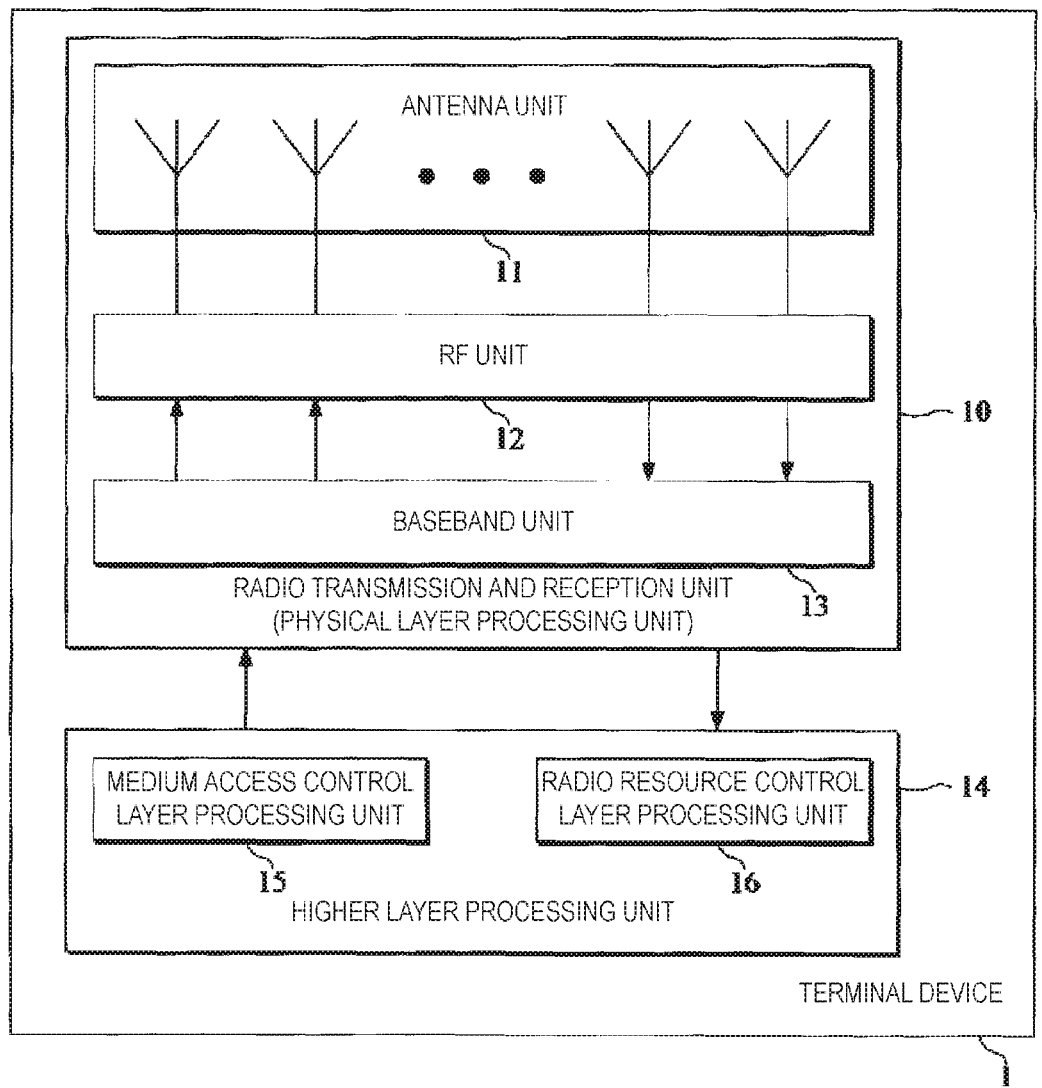
FIG. 14 is a schematic block diagram illustrating a configuration of a terminal device 1 in the present embodiment.

FIG. 14 is a schematic block diagram illustrating a configuration of the terminal device 1 in the present embodiment. As illustrated in FIG. 14, the terminal device 1 is configured to include a radio transmission and reception unit 10 and a higher layer processing unit 14. The radio transmission and reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16. The radio transmission and reception unit 10 is also referred to as a transmission unit, a reception unit, or a physical layer processing unit.

The higher layer processing unit 14 outputs uplink data (a transport block) generated by a user operation or the like, to the radio transmission and reception unit 10. The higher layer processing unit 14 performs processing of the Medium Access Control (MAC) layer, a Packet Data Convergence Protocol (PDCP) layer, a Radio Link Control (RLC) layer, and the Radio Resource Control (RRC) layer.

The medium access control layer processing unit 15 included in the higher layer processing unit 14 performs processing of the medium access control layer. The medium access control layer processing unit 15 controls HARQ in accordance with the various pieces of configuration information/parameters managed by the radio resource control layer processing unit 16. The medium access control layer processing unit 15 manages multiple HARQ entities, multiple HARQ processes, and multiple HARQ buffers.

The medium access control layer processing unit 15 identifies (selects, determines) a PDCCH subframe. The medium access control layer processing unit 15 performs processing of DRX, based on the PDCCH subframe. The medium access control layer processing unit 15 manages a timer relating to DRX, based on the PDCCH subframe. The medium access control layer processing unit 15 instructs the radio transmission and reception unit 10 to monitor the PDCCH in the subframe. The monitoring of the PDCCH denotes an attempt to decode the PDCCH in accordance with a DCI format.

The radio resource control layer processing unit 16 included in the higher layer processing unit 14 performs the processing of the radio resource control layer. The radio resource control layer processing unit 16 manages various pieces of configuration information/parameters of the terminal device 1. The radio resource control layer processing unit 16 sets the various pieces of configuration information/parameters in accordance with RRC layer signaling received from the base station device 3. Specifically, the radio resource control layer processing unit 16 sets the various pieces of configuration information/parameters in accordance with the information indicating the various pieces of configuration information/parameters that have been received from the base station device 3.

The radio transmission and reception unit 10 performs processing of the physical layer, such as modulation, demodulation, coding, and decoding. The radio transmission and reception unit 10 demultiplexes, demodulates, and decodes a signal received from the base station device 3, and outputs the information resulting from the decoding to the higher layer processing unit 14. The radio transmission and reception unit 10 modulates and codes data to generate a transmit signal, and transmits the transmit signal to the base station device 3.

The RF unit 12 converts (down-converts) a signal received through the antenna unit 11 into a baseband signal by orthogonal demodulation and removes unnecessary frequency components. The RF unit 12 outputs a processed analog signal to the baseband unit.

The baseband unit 13 converts the analog signal that has been input from the RF unit 12, into a digital signal. The baseband unit 13 removes a portion corresponding to a Cyclic Prefix (CP) from the digital signal that has been converted, performs Fast Fourier Transform (FFT) on the signal from which the CP has been removed, and extracts a signal of a frequency domain.

The baseband unit 13 performs Inverse Fast Fourier Transform (IFFT) on data, generates SC-FDMA symbols, attaches a CP to the generated SC-FDMA symbols, generates a baseband digital signal, and converts the baseband digital signal into an analog signal. The baseband unit 13 outputs such a converted analog signal to the RF unit 12.

The RF unit 12 removes unnecessary frequency components from the analog signal that has been input from the baseband unit 13 by using a low-pass filter, up-converts the analog signal into a signal of a carrier frequency, and transmits such an up-converted signal via the antenna unit 11. Moreover, the RF unit 12 amplifies the power. Moreover, the RF unit 12 may have a function of controlling the transmit power. The RF unit 12 is also referred to as a transmit power control unit.

Figure 15:
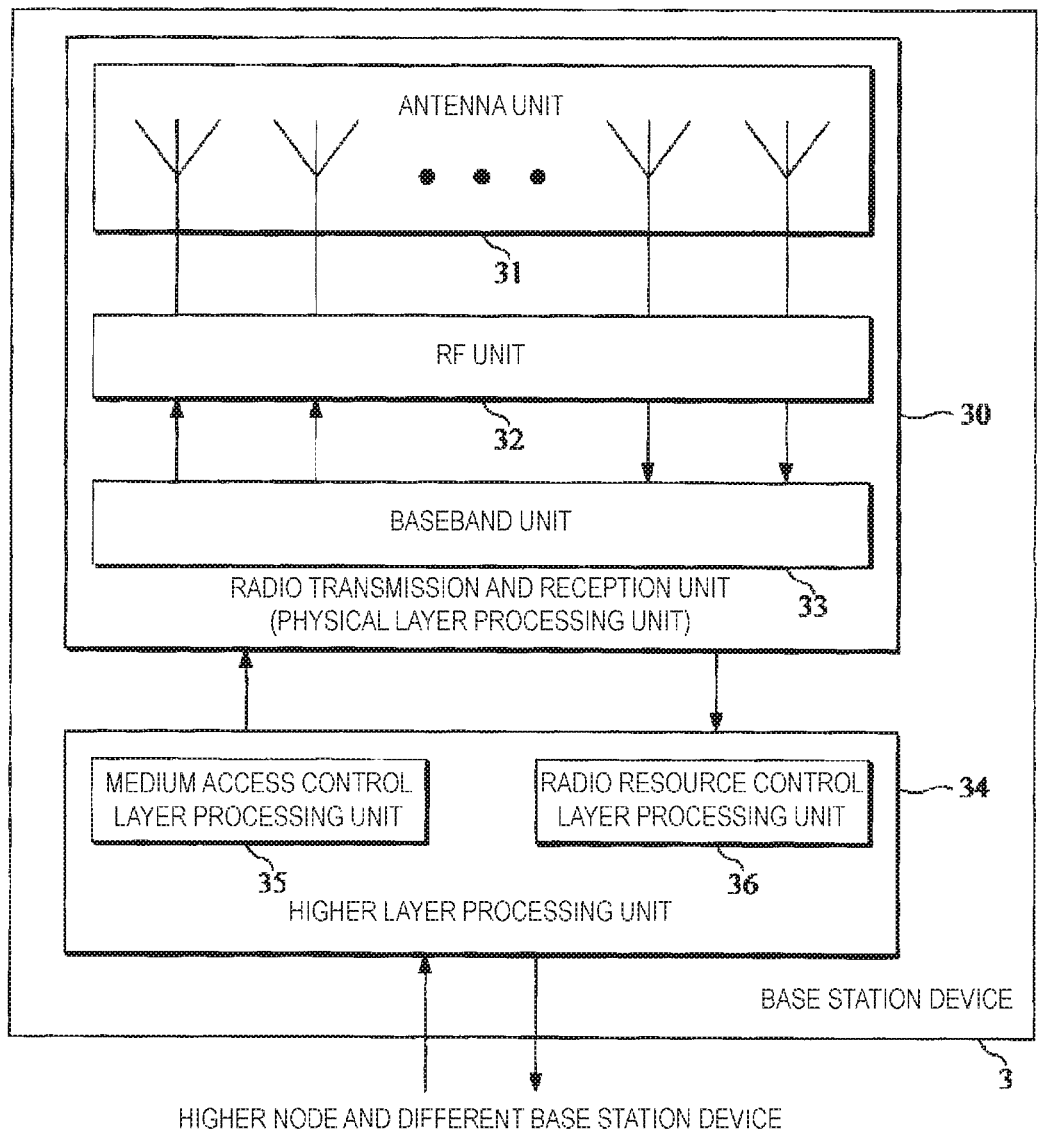
FIG. 15 is a schematic block diagram illustrating a configuration of a base station device 3 in the present embodiment.

FIG. 15 is a schematic block diagram illustrating a configuration of the base station device 3 in the present embodiment. As illustrated in FIG. 15, the base station device 3 is configured to include a radio transmission and reception unit 30 and a higher layer processing unit 34. The radio transmission and reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and reception unit 30 is also referred to as a transmission unit, a reception unit, or a physical layer processing unit.

The higher layer processing unit 34 performs processing of the Medium Access Control (MAC) layer, a Packet Data Convergence Protocol (PDCP) layer, a Radio Link Control (RLC) layer, and the Radio Resource Control (RRC) layer.

The medium access control layer processing unit 35 included in the higher layer processing unit 34 performs the processing of the Medium Access Control layer. The medium access control layer processing unit 15 controls HARQ in accordance with the various pieces of configuration information/parameters managed by the radio resource control layer processing unit 16. The medium access control layer processing unit 15 generates an ACK/NACK and HARQ information with respect to uplink data (UL-SCH). The ACK/NACK and HARQ information with respect to the uplink data (UL-SCH) are transmitted to the terminal device 1 on the PHICH or the PDCCH.

The radio resource control layer processing unit 36 included in the higher layer processing unit 34 performs the processing of the Radio Resource Control layer. The radio resource control unit 36 generates, or acquires from a higher node, downlink data (a transport block) arranged on a physical downlink shared channel, system information, an RRC message, a MAC Control Element (CE), and the like, and outputs the generated or acquired data to the radio transmission and reception unit 30. Furthermore, the radio resource control layer processing unit 36 manages various pieces of configuration information/parameters for each of the terminal devices 1. The radio resource control layer processing unit 36 may set various pieces of configuration information/parameters for each of the terminal devices 1 via the higher layer signaling. In other words, the radio resource control layer processing unit 36 transmits/broadcasts information indicating various pieces of configuration information/parameters.

The function of the radio transmission and reception unit 30 is similar to the function of the radio transmission and reception unit 10, and hence description thereof is omitted.

Hereinafter, various aspects of the terminal device and the base station device in the present embodiment will be described.

(1) In a first aspect of the present embodiment, a terminal device 1 includes a reception unit 10 configured to attempt to decode each of multiple Physical Downlink Control CHannels (PDCCHs) in a set of multiple PDCCH candidates in an Active Time, in a case where discontinuous reception is configured. The Active Time includes a period while a first timer (a drx-InactivityTimer) is running. The multiple PDCCH candidates include one or more first PDCCH candidates and one or more second PDCCH candidates. Each of the one or more first PDCCH candidates is included in a first subframe to a second subframe. Each of the one or more second PDCCH candidates is included in the first subframe to a third subframe subsequent to the second subframe. When the PDCCH is detected in one of the one or more first PDCCH candidates, the first timer is set based on at least a first higher layer parameter value and a first value, and the first timer is started in the second subframe. Here, the first value is based on at least the number of subframes including the first PDCCH candidate and the number of subframes including the second PDCCH candidate.

(2) In the first aspect of the present embodiment, the reception unit 10 receives a first subframe number or information indicating a position of the first subframe.

(3) In a second aspect of the present embodiment, a terminal device 1 includes a reception unit 10 configured to attempt to decode each of multiple Physical Downlink Control CHannels (PDCCHs) in a set of multiple PDCCH candidates in an Active Time, in a case where discontinuous reception is configured. The Active Time includes a period while a first timer (a drx-InactivityTimer) is running. The multiple PDCCH candidates include one or more first PDCCH candidates and one or more second PDCCH candidates. Each of the one or more first PDCCH candidates is included in multiple subframes from a first subframe to a second subframe. Each of the one or more second PDCCH candidates is included in multiple subframes from the first subframe to a third subframe subsequent to the second subframe. When the PDCCH is detected in one of the one or more first PDCCH candidates, the first timer is set, based on at least a first higher layer parameter value, and the first timer is started in the third subframe.

(4) In the second aspect of the present embodiment, the reception unit 10 the reception unit 10 receives the number of the first subframe or information indicating the position of the first subframe.

(5) In a third aspect of the present embodiment, a terminal device 1 includes a reception unit 10 configured to attempt to decode each of multiple Physical Downlink Control CHannels (PDCCHs) in a set of multiple PDCCH candidates in an Active Time, in a case where discontinuous reception is configured. The Active Time includes a period in which a first timer (a drx-RetransmissionTimer) is running. The first timer is started on the expiration of a second timer (a HARQ RTT timer). The multiple PDCCH candidates include one or more first PDCCH candidates and one or more second PDCCH candidates. Each of the one or more first PDCCH candidates is included in multiple subframes from a first subframe to a second subframe. Each of the one or more second PDCCH candidates is included in multiple subframes from the first subframe to a third subframe subsequent to the second subframe. When the PDCCH is detected in one of the one or more first PDCCH candidates, the second timer is set based on at least a first higher layer parameter value, a first value, and a second value, and the second timer is started in the second subframe. The first value is based on at least the number of subframes including the first PDCCH candidate and the number of subframes including the second PDCCH candidate. The second value is based on at least (I) information included in the detected PDCCH in the first PDCCH candidates and/or (II) the number of subframes including the first PDCCH candidates.

(6) In the third aspect of the present embodiment, the reception unit 10 receives a first subframe number or information indicating a position of the first subframe.

(7) In a fourth aspect of the present embodiment, a terminal device 1 includes a reception unit 10 configured to attempt to decode each of multiple Physical Downlink Control CHannels (PDCCHs) in a set of multiple PDCCH candidates in an Active Time, in a case where discontinuous reception is configured. The Active Time includes a period while a first timer (a drx-RetransmissionTimer) is running. The first timer is started on the expiration of a second timer (a HARQ RTT timer). The multiple PDCCH candidates include one or more first PDCCH candidates and one or more second PDCCH candidates. Each of the one or more first PDCCH candidates is included in multiple subframes from a first subframe to a second subframe. Each of the one or more second PDCCH candidates is included in multiple subframes from the first subframe to a third subframe subsequent to the second subframe. When the PDCCH is detected in one of the one or more first PDCCH candidates, the second timer (a HARQ RTT timer) is set based on at least a first higher layer parameter value and a first value, and the second timer is started in the third subframe. The first value is based on at least (I) information included in the detected PDCCH in the first PDCCH candidates and/or (II) the number of subframes including the first PDCCH candidates.

(8) In the fourth aspect of the present embodiment, the reception unit 10 receives a first subframe number or information indicating a position of the first subframe.

(9) In a fifth aspect of the present embodiment, a terminal device 1 includes a reception unit 10 configured to attempt to decode each of multiple Physical Downlink Control CHannels (PDCCHs) in a set of multiple PDCCH candidates in an Active Time, in a case where discontinuous reception is configured. The multiple PDCCH candidates include one or more first PDCCH candidates. Each of the one or more first PDCCH candidates is included in a first subframe to a second subframe. Irrespective of whether the subframes from the next subframe of the first subframe to the second subframe are included in an Active Time, the reception unit 10 does not attempt to decode each of the multiple PDCCHs of the one or more first PDCCH candidates, when the first subframe is not included in the Active Time.

(10) In the fifth aspect of the present embodiment, the multiple PDCCH candidates include one or more second PDCCH candidates. Each of the one or more second PDCCH candidates is included in multiple subframes from a third subframe to a fourth subframe. Irrespective of whether the subframes from the next subframe of the third subframe to the fourth subframe are included in the Active Time, the reception unit 10 attempts to decode each of the multiple PDCCHs among the one or more second PDCCH candidates when the third subframe is included in the Active Time.

(11) In a sixth aspect of the present embodiment, included are: a reception unit 10 configured to attempt to decode each of multiple Physical Downlink Control CHannels (PD-CCHs) in a set of multiple PDCCH candidates in an Active Time, in a case where discontinuous reception is configured; and a transmission unit 10 configured to report a Channel Quality Indicator (CQI) on a first Physical Uplink Control CHannel (PUCCH) included in a first subframe to a second subframe. In a case where a first higher layer parameter/CQI masking (cqi-Mask) is not configured by a higher layer and the first subframe is not included in the Active Time in consideration of information (a downlink assignment, an uplink grant, and/or a DRX command MAC CE) received and/or a scheduling request transmitted until and including the first subframe by X subframes, the transmission unit 10 does not report the CQI on the PUCCH included in the first subframe to the second subframe, irrespective of whether the next subframe of the first subframe to the second subframe are included in the Active Time.

(12) In the sixth aspect of the present embodiment, in a case where the first higher layer parameter is configured by a higher layer and a first timer (an onDurationTimer) is not running in the first subframe in consideration of information received and/or a scheduling request transmitted until and including the first subframe, the transmission unit 10 does not report the CQI on the PUCCH included in the first subframe to the second subframe, irrespective of whether the first timer (the onDurationTimer) is running in a next subframe of the first subframe to the second subframe.

(13) In the sixth aspect of the present embodiment, a second PUCCH for reporting of the CQI is included in a third subframe to a fourth subframe. In a case where the first higher layer parameter is not configured by a higher layer and the third subframe is included in an Active Time in consideration of information received and/or a scheduling request transmitted until and including the third subframe, the transmission unit 10 reports the CQI on the second PUCCH included in the third subframe to the fourth subframe, irrespective of whether a next subframe of the third subframe to the fourth subframe are included in the Active Time.

(14) In the sixth aspect of the present embodiment, in a case where the first higher layer parameter is configured by a higher layer and a first timer (an onDurationTimer) is running in the third subframe in consideration of information received and/or a scheduling request transmitted until and including the third subframe, the transmission unit 10 reports the CQI on the second PUCCH included in the third subframe to the fourth subframe, irrespective of whether the first timer (the onDurationTimer) is running in the subframes from the next subframe of the third subframe to the fourth subframe.

(15) In the sixth aspect of the present embodiment, a third PUCCH for transmission of a Hybrid Automatic Repeat reQuest ACKnowledgement (HARQ-ACK) is included in a fifth subframe to a sixth subframe. The transmission unit 10 transmits the HARQ-ACK on the third PUCCH included in the fifth subframe to the sixth subframe, irrespective of whether some of or all of the fifth subframe to the sixth subframe are included in the Active Time.

(16) In the sixth aspect of the present embodiment, the above-described X is 5.

With this configuration, the terminal device 1 is capable of efficiently communicating with the base station device 3.

A program running on each of the base station device 3 and the terminal device 1 in the present invention may be a program for controlling a Central Processing Unit (CPU) and the like (a program for causing a computer to operate) to enable the functions in the above-described embodiment of the present invention. Information handled in these devices is temporarily stored in a Random Access Memory (RAM) while being processed. Subsequently, the information is stored in various types of Read Only Memory (ROM), such as a flash ROM and a Hard Disk Drive (HDD), and is read by the CPU to be modified or rewritten, as appropriate.

Note that, the terminal device 1 and the base station device 3 in the above-described embodiment may be partially achieved by a computer. This configuration may be achieved by recording a program for enabling such control functions on a computer-readable medium and causing a computer system to read the program recorded in the recording medium for execution.

Note that the "computer system" herein refers to a computer system built into the terminal device 1 or the base station device 3, and the computer system includes an OS and hardware components, such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium for dynamically holding a program for a short period of time, such as a communication line that is used to transmit the program over a network such as the Internet or over a communication circuit such as a telephone circuit, and a medium for holding, in such a case, a program for a fixed period of time, such as a volatile memory within a computer system that functions as a server or a client. Furthermore, the program may be configured to enable some of the functions described above, and may also be configured to enable the functions described above in combination with a program already recorded in a computer system.

Furthermore, the base station device 3 in the above-described embodiments can be achieved as an aggregation (a device group) including multiple devices. Devices constituting the device group may be each equipped with some or all portions of each function or each functional block of the base station device 3 in the above-described embodiments. The device group may include at least a general function or a general functional block of the base station device 3. Furthermore, the terminal device 1 in the above-described embodiments is also capable of communicating with the base station device, as an aggregation.

Furthermore, the base station device 3 in the above-described embodiments may be an Evolved Universal Terrestrial Radio Access Network (EUTRAN). Furthermore, the base station device 3 in the above-described embodiments may have some or all portions of the functionality of a node higher than an eNodeB.

Furthermore, some or all portions of each of the terminal device 1 and the base station device 3 in the above-described embodiments may be achieved as an LSI, which is a typical integrated circuit, or may be achieved as a chip set. The functional blocks of each of the terminal device 1 and the base station device 3 may be individually achieved as a chip, or some or all of the functional blocks may be integrated into a chip. Furthermore, a circuit integration technique is not limited to the LSI, and the integrated circuit may be achieved with a dedicated circuit or a general-purpose processor. Furthermore, in a case where advances in the semiconductor technology enable a circuit integration technology that can replace the LSI, such an advanced integrated circuit may be applicable.

Furthermore, in the above-described embodiments, the terminal device has been described as one example of a communication device, but the present invention is not limited to this configuration. the above-described terminal device is applicable to a fixed-type or a stationary-type electronic apparatus installed indoors or outdoors, for example, a terminal device or a communication device, such as an Audio-Video (AV) apparatus, a kitchen appliance, a cleaning or washing machine, an air-conditioning apparatus, office equipment, a vending machine, and other household apparatuses.

Embodiments of the present invention have been described in detail with reference to the drawings, but a specific configuration is not limited to the embodiments, and includes, for example, any changes to a design that falls within the scope that does not depart from the gist of the present invention. Furthermore, various modifications are available within the scope of the present invention defined by claims, and embodiments that are made by suitably combining technical measures disclosed in the different embodiments are also included in the technical scope of the present invention. Furthermore, a configuration in which a component element that achieves the same effect is substituted for the one that is described in the embodiments is also included in the technical scope of the present invention.

INDUSTRIAL APPLICABILITY

Some aspects of the present invention are applicable to a terminal device, a communication method, and an integrated circuit where the terminal device and a base station device are demanded to communicate in an efficient manner.

DESCRIPTION OF REFERENCE NUMERALS

1 (1A, 1B, 1C) Terminal device
3 Base station device
10 Radio transmission and reception unit
11 Antenna unit
12 RF unit
13 Baseband unit
14 Higher layer processing unit
15 Medium access control layer processing unit
16 Radio resource control layer processing unit
30 Radio transmission and reception unit
31 Antenna unit
32 RF unit
33 Baseband unit
34 Higher layer processing unit
35 Medium access control layer processing unit
36 Radio resource control layer processing unit

The invention claimed is:

1. A terminal device comprising:
reception circuitry configured to monitor a Machine type communication Physical Downlink Control Channel (MPDCCH) in a set of MPDCCH candidates; and
medium access control layer processing circuitry configured to perform a DRX functionality for controlling monitoring of the MPDCCH, wherein
the set includes a first MPDCCH candidate and a second MPDCCH candidate,
a starting subframe among first subframes which include the first MPDCCH candidate is identical to a starting subframe among second subframes which include the second MPDCCH candidate,
a repetition level of the first MPDCCH candidate is lower than a repetition level of the second MPDCCH candidate, and
in a case that the MPDCCH detected in the first MPDCCH candidate indicates a new transmission, the medium access control layer processing circuitry starts or restarts a drx-InactivityTimer in a subframe following a last subframe among subframes including the MPDCCH.

2. A communication method used by a terminal device, the communication method comprising:
monitoring a Machine type communication Physical Downlink Control Channel (MPDCCH) in a set of MPDCCH candidates; and
performing a DRX functionality for controlling monitoring of the MPDCCH, wherein the set includes a first MPDCCH candidate and a second MPDCCH candidate, a starting subframe among first subframes which include the first MPDCCH candidate is identical to a starting subframe among second subframes which include the second MPDCCH candidate, a repetition level of the first MPDCCH candidate is lower than a repetition level of the second MPDCCH candidate, in a case that the MPDCCH detected in the first MPDCCH candidate indicates a new transmission, a drx-InactivityTimer is started or restarted in a subframe following a last subframe among subframes including the MPDCCH.

3. An integrated circuit mounted on a terminal device, the integrated circuit comprising:

reception circuitry configured to monitor a Machine type communication Physical Downlink Control Channel (MPDCCH) in a set of MPDCCH candidates; and medium access control layer processing circuitty configured to perform a DRX functionality for controlling monitoring of the MPDCCH, wherein the set includes a first MPDCCH candidate and a second MPDCCH candidate, a starting subframe among first subframes which include the first MPDCCH candidate is identical to a starting subframe among second subframes which include the second MPDCCH candidate, a repetition level of the first MPDCCH candidate is lower than a repetition level of the second MPDCCH candidate, wherein in a case that the MPDCCH detected in the first MPDCCH candidate indicates a new transmission, the medium access control layer processing circuitry starts or restarts a drx-InactivityTimer in a subframe following a last subframe among subframes including the MPDCCH.

* * * * *